(12) United States Patent     (10) Patent No.:   US 12,666,327 B2

Yu et al.                      (45) Date of Patent:      Jun. 23, 2026

(54) SERVICE PACKET TRANSMISSION METHOD AND APPARATUS

(71) Applicant: HUAWEI TECHNOLOGIES CO., LTD., Shenzhen (CN)

(72) Inventors: Fang Yu, Beijing (CN); Yan Li, Beijing (CN); Hui Ni, Beijing (CN); Yongcui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 843 days.

(21) Appl. No.: 17/558,059

(22) Filed: Dec. 21, 2021

(65) Prior Publication Data

US 2022/0116828 A1     Apr. 14, 2022

Related U.S. Application Data

(63) Continuation of application No. PCT/CN2020/097394, filed on Jun. 22, 2020.

(30) Foreign Application Priority Data

Jun. 24, 2019    (CN) .......................... 201910551334.0

(51) Int. Cl.
     *H04W 36/06*       (2009.01)
     *H04W 36/08*       (2009.01)
              (Continued)

(52) U.S. Cl.
     CPC ........... *H04W 36/06* (2013.01); *H04W 36/08* (2013.01); *H04W 48/18* (2013.01); *H04W 72/20* (2023.01)

(58) Field of Classification Search
     CPC ................................................. H04W 36/0033
     See application file for complete search history.

(56) References Cited

U.S. PATENT DOCUMENTS

2018/0124660 A1    5/2018   Zhang et al.
2018/0199279 A1    7/2018   Baek et al.
              (Continued)

FOREIGN PATENT DOCUMENTS

CN      101651971 A     2/2010
CN      108632928 A    10/2018
              (Continued)

OTHER PUBLICATIONS

3GPP TS 23.501 V16.1.0 (Jun. 2019), "3rd Generation Partnership Project; Technical Specification Group Services and System Aspects; System Architecture for the 5G System; Stage 2(Release 16)," Jun. 2019, 367 pages.

(Continued)

*Primary Examiner* — Pamit Kaur

(74) *Attorney, Agent, or Firm* — Fish & Richardson P.C.

(57)            ABSTRACT

The present disclosure relates to service packet transmission methods. In one example method, a target user plane network element receives a first uplink service packet from a source user plane, where the first uplink service packet is an uplink service packet received by the source user plane after receiving a second uplink service packet, and the second uplink service packet is the last uplink service packet from the source user plane to a source application server. The target user plane network element receives first indication information, used to indicate that sending of the first uplink service packet by the source user plane network element ends, from the source user plane network element. The target user plane network element sends, to a target AS after the first uplink service packet is sent, an uplink service packet that is from an access network device to the target user plane network element.

20 Claims, 14 Drawing Sheets

(51) Int. Cl.
  *H04W 48/18* (2009.01)
  *H04W 72/20* (2023.01)

(56) References Cited

U.S. PATENT DOCUMENTS

| | | | | |
|---|---|---|---|---|
| 2018/0317157 A1* | 11/2018 | Baek | .................... | H04W 28/16 |
| 2018/0324631 A1 | 11/2018 | Jheng et al. | | |
| 2019/0158408 A1* | 5/2019 | Li | ........................ | H04W 72/56 |
| 2020/0120665 A1 | 4/2020 | Jin et al. | | |

FOREIGN PATENT DOCUMENTS

| | | | |
|---|---|---|---|
| CN | 109673008 A | 4/2019 |
| CN | 109691179 A | 4/2019 |
| CN | 109756937 A | 5/2019 |
| CN | 109788513 A | 5/2019 |
| CN | 109788514 A | 5/2019 |
| CN | 109842639 A | 6/2019 |
| WO | 2018137489 A1 | 8/2018 |
| WO | 2018206844 A1 | 11/2018 |
| WO | 2019001174 A1 | 1/2019 |
| WO | 2019035406 A1 | 2/2019 |

OTHER PUBLICATIONS

3GPP TS 23.502 V16.1.1 (Jun. 2019), "3rd Generation Partnership Project; Technical Specification Group Services and System Aspects; Procedures for the 5G System; Stage 2(Release 16)," Jun. 2019, 494 pages.

Huawei, Intel, "Discussion on SA2 Edge computing study," 3GPP TSG-SA WG2 Meeting #131, S2-1901832, Feb. 2019, 13 pages.
Huawei, HiSilicon, "I-SMF relocation with I-UPF as an ULCL or BP," 3GPP TSG-SA WG2 Meeting #132, S2-1903580, Xi'an, China, Apr. 8-12, 2019, 7 pages.
Jia et al., "Research on 5G Core Network Construction Path Selection and Deployment Solution," Internet World, China Internet, Issue 9, 2018, 8 pages (with English abstract).
Office Action issued in Chinese Application No. 201910551334.0 on Apr. 22, 2021, 13 pages (with English translation).
PCT International Search Report and Written Opinion issued in International Application No. PCT/CN2020/097394 on Sep. 25, 2020, 15 pages (with English translation).
3GPP TR 23.725, V16.2.0 (2019-06), "3rd Generation Partnership Project; Technical Specification Group Services and System Aspects; Study on enhancement of Ultra-Reliable Low-Latency Communication(URLLC) support in the SG Core network (SGC) (Release 16) ," Jun. 2019, 94 pages.
Extended European Search Report issued in European Application No. 20833120.7 on Jul. 28, 2022, 14 pages.
Huawei et al., "End Marker for the PDU session of HR roaming," 3GPP TSG-SA2 Meeting #134, S2-1907212, Sapporo, Japan, Jun. 24-28, 2019, 12 pages.
Intel, "Solution for session continuity during UE mobility (Key Issue#3)," 3GPP SA WG2 Meeting #127-bis, 82-185633, Newport Beach, USA, May 28-Jun. 1, 2018, 8 pages.
NEC, "Session management with flexible UP GW(s) assignment," 3GPP SA WG2 Meeting #116, S2-163937, Wein, Austria, Jul. 11-15, 2016, 6 pages.

* cited by examiner

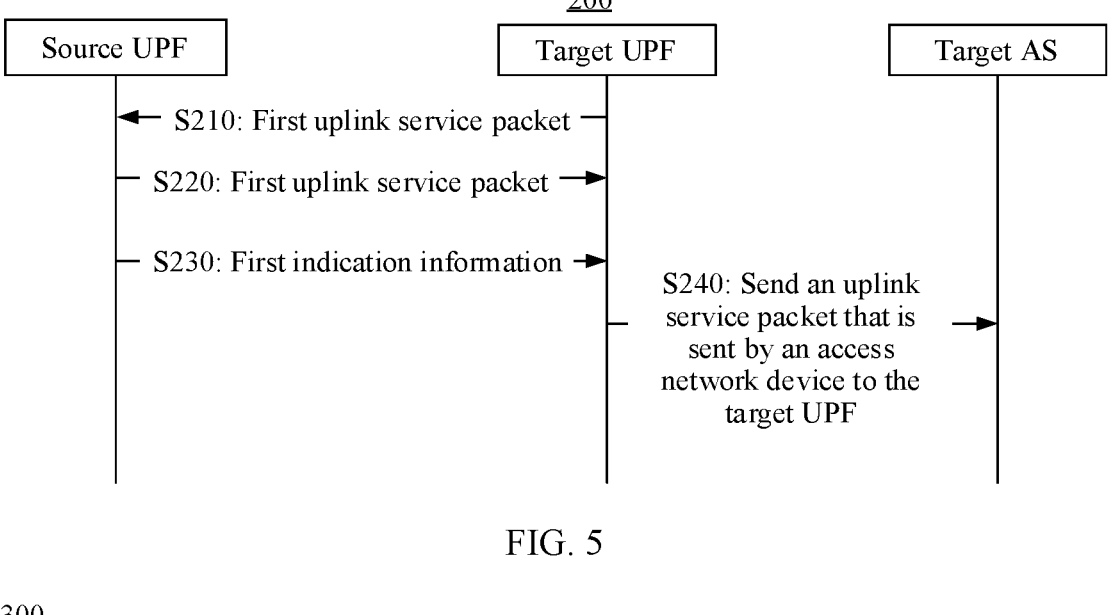

200

Source UPF — Target UPF — Target AS

S210: First uplink service packet

S220: First uplink service packet

S230: First indication information

S240: Send an uplink service packet that is sent by an access network device to the target UPF

A source AS receives first notification information sent by an SMF network element, where the first notification information is used to notify that a DNAI changes or is used to notify that a UPF network element changes, and the first notification information includes a target data network access point identifier DNAI and an identifier of a terminal apparatus

S310

After the source AS determines that processing of a first downlink service packet and a second uplink service packet is complete, the source AS migrates a context of the terminal apparatus to a target AS corresponding to the target DNAI

CONT.
FROM

FROM

FROM

FROM

S622: First uplink service packet

S623: Second indication information

S624: First uplink service packet

S625: First indication information

S626: Context migration complete message

S627: Uplink service packet

SERVICE PACKET TRANSMISSION METHOD AND APPARATUS

CROSS-REFERENCE TO RELATED APPLICATIONS

This application is a continuation of International Application No. PCT/CN2020/097394, filed on Jun. 22, 2020, which claims priority to Chinese Patent Application No. 201910551334.0, filed on Jun. 24, 2019. The disclosures of the aforementioned applications are hereby incorporated by reference in their entireties.

TECHNICAL FIELD

This application relates to the communication field, and more specifically, to a service packet transmission method and apparatus in the communication field.

BACKGROUND

When a terminal apparatus moves from coverage of an original access network device to coverage of a current access network device, air interface handover is triggered, that is, the terminal apparatus is handed over from the original access network device to the current access network device. Although a location of the terminal apparatus changes, the terminal apparatus still accesses an original user plane network element. However, in practice, a user plane network element closest to the terminal apparatus may have changed, but the terminal apparatus still performs packet transmission with the original user plane network element. In this case, a transmission path is relatively long, and accordingly, a packet transmission latency increases. To reduce the packet transmission latency, the transmission path needs to be switched from the original user plane network element to a new user plane network element. In a switching process, uplink and downlink service packets that have not been transmitted are prone to be lost, and transmission performance deteriorates.

SUMMARY

This application provides a service packet transmission method, to improve transmission performance.

According to a first aspect, a service packet transmission method is provided. The method includes: A target user plane function receives a first uplink service packet from a source user plane network element, where the first uplink service packet is an uplink service packet received by the source user plane network element after the source user plane network element receives a second uplink service packet, and the second uplink service packet is the last uplink service packet sent by the source user plane network element to a source application server.

The target user plane network element receives first indication information from the source user plane network element, where the first indication information is used to indicate that sending of the first uplink service packet by the source user plane network element ends.

After the target user plane network element receives the first indication information, the target user plane network element sends, to a target application server after the first uplink service packet is sent, an uplink service packet that is sent by an access network device to the target user plane network element.

Therefore, in this embodiment of this application, after sending the last second uplink service packet to the source application server, the source user plane network element sends the first uplink service packet after the second uplink service packet to the target application server by using the target user plane network element, preventing loss of the first uplink service packet. In addition, the source user plane network element may send the first indication information to the target user plane network element, to indicate that the sending of the first uplink service packet by the source user plane network element ends. In this way, the target user plane network element can be prevented from keeping waiting to receive an uplink service packet sent by the source user plane network element. After receiving the first indication information, and after sending, to the target application server, the uplink service packet that is from the source user plane network element, the target user plane network element sends the uplink service packet that is sent by the access network device to the target user plane network element, to avoid out-of-order of uplink service packets.

In some possible implementations, before the target user plane network element receives the first uplink service packet from the source user plane network element, the method further includes:

The target user plane network element sends the first uplink service packet and second indication information to the source user plane network element, where the second indication information is used to indicate that the sending of the first uplink service packet by the target user plane network element ends.

It should be noted that the first indication information and the second indication information may be signaling between different network elements, but the first indication information and the second indication information may include a same information element, to be specific, the same information element may be an identifier indicating that the sending of the uplink service packet ends. In other words, after the target user plane network element sends the second indication information to the source user plane network element, the source user plane network element may determine that the sending of the uplink service packet that is from the target user plane network element ends. That is, the target user plane network element no longer sends an uplink service packet to the source user plane network element. After the source user plane network element sends the first indication information to the target user plane network element, the target user plane network element may determine that the sending of the uplink service packet that is from the source user plane network element ends. That is, the source user plane network element no longer sends an uplink service packet to the target user plane network element.

In some possible implementations, before the target user plane network element receives the first uplink service packet from the source user plane network element, the method further includes:

The target user plane network element receives a first downlink service packet and third indication information from the source user plane network element, where the third indication information is used to indicate that sending of a downlink service packet that is from the source application server ends.

In some possible implementations, after the target user plane network element receives the third indication information from the source user plane network element, the method further includes:

After the first downlink service packet is sent, the target user plane network element sends, to the access network device, a downlink service packet that is from the target application server.

In some possible implementations, that the target user plane network element sends second indication information to the source user plane network element includes:

The target user plane network element sends the second indication information to the source user plane network element based on the third indication information.

In some possible implementations, that the target user plane network element sends second indication information to the source user plane network element includes:

After the target user plane network element receives the downlink service packet from the target application server or receives a context relocation complete message from a session management function network element, the target user plane network element sends the second indication information to the source user plane network element.

In some possible implementations, before the target user plane network element sends the second indication information to the source user plane network element, the target user plane network element determines information used to establish a tunnel between the target user plane network element and the source user plane network element, where the tunnel information is used to establish an uplink service packet forwarding tunnel between the source user plane network element and the target user plane network element.

In some possible implementations, the target user plane network element may send the tunnel information to a target session management network element. In this way, the target session management network element may send the tunnel information to a central session management network element, the central session management network element may send the tunnel information to a source session management network element, and the source session management network element sends the tunnel information to the source user plane network element, so that the source user plane network element and the target user plane network element may establish, based on the tunnel information, the uplink service packet forwarding tunnel.

In some possible implementations, the target user plane network element may send the tunnel information to the central session management network element. In this way, the central session management network element may send the tunnel information to the source user plane network element, so that the source user plane network element and the target user plane network element may establish, based on the tunnel information, the uplink service packet forwarding tunnel.

According to a second aspect, a service packet transmission method is provided. The method includes: After a source user plane network element receives a second uplink service packet, the source user plane network element receives a first uplink service packet, where the second uplink service packet is the last uplink service packet sent by the source user plane network element to a source application server; the source user plane network element sends the first uplink service packet to a target user plane network element; and the source user plane function network element sends first indication information to the target user plane network element, where the first indication information is used to indicate that the sending of the first uplink service packet by the source user plane network element ends.

Therefore, in this embodiment of this application, after sending the last second uplink service packet to the source application server, the source user plane network element sends the first uplink service packet after the second uplink service packet to a target application server by using the target user plane network element, preventing loss of the first uplink service packet. In addition, the source user plane network element may send the first indication information to the target user plane network element, to indicate that the sending of the first uplink service packet by the source user plane network element ends. In this way, the target user plane network element can be prevented from keeping waiting to receive an uplink service packet sent by the source user plane network element. After receiving the first indication information, and after sending, to the target application server, the uplink service packet that is from the source user plane network element, the target user plane network element sends an uplink service packet that is sent by an access network device to the target user plane network element, to avoid out-of-order of uplink service packets.

In some possible implementations, before the source user plane network element sends the first uplink service packet to the target user plane network element, the method further includes:

The source user plane network element receives second indication information from the target user plane network element, where the second indication information is used to indicate that sending of the first uplink service packet by the target user plane network element ends. Optionally, after receiving the first uplink service packet sent by the target user plane network element, the source user plane network element receives the second indication information sent by the target user plane network element; or the source user plane network element may simultaneously receive the second indication information and the first uplink service packet that are sent by the target user plane network element.

In some possible implementations, before the source user plane network element sends the first uplink service packet to the target user plane network element, the method further includes:

The source user plane network element sends a first downlink service packet and third indication information to the target user plane network element, where the third indication information is used to indicate that sending of a downlink service packet that is from the source application server ends.

In some possible implementations, that the source user plane network element receives second indication information from the target user plane network element includes:

The source user plane network element receives the second indication information sent by the target user plane network element based on the third indication information.

In some possible implementations, before the source user plane network element sends the first downlink service packet and the third indication information to the target user plane network element, the method further includes:

The source user plane network element receives fourth indication information sent by a first network element, where the fourth indication information is used to indicate that the first downlink service packet is the last downlink service packet from the source application server.

The source user plane network element sends fifth indication information to the first network element, where the fifth indication information is used to indicate that the second uplink service packet is the last uplink service packet sent by the source user plane network element to the source application server.

In some possible implementations, the first network element may be the source application server, a management network element of the source application server, or a control plane network element of the source application server.

In some possible implementations, the fourth indication information is a sequence number of the first downlink service packet, and the fifth indication information is a sequence number of the second uplink service packet.

In some possible implementations, the method further includes: The source user plane network element receives tunnel information sent by a central session management network element or a source session management network element, where the tunnel information is used to establish an uplink service packet forwarding tunnel between the source user plane network element and the target user plane network element.

According to a third aspect, a service packet transmission method is provided. The method includes: A source application server receives first notification information sent by a session management function session management network element, where the first notification information is used to notify that a data network access point identifier changes or is used to notify that a target user plane network element changes, and the first notification information includes a target data network access point identifier and an identifier of a terminal apparatus.

After the source application server determines that processing of a first downlink service packet and a second uplink service packet is complete, the source application server relocates a context of the terminal apparatus to a target application server corresponding to the target data network access point identifier, where the first downlink service packet is the last downlink service packet sent by the source application server to a source user plane function network element, and the second uplink service packet is the last uplink service packet sent by the source user plane network element to the source application server.

In some possible implementations, before the source application server relocates the context of the terminal apparatus to the target application server corresponding to the target data network access point identifier, the method further includes:

The source application server sends fourth indication information to the source user plane network element, where the fourth indication information is used to indicate that the first downlink service packet is the last downlink service packet from the source application server.

The source application server receives fifth indication information sent by the source user plane network element, where the fifth indication information is used to indicate that the second uplink service packet is the last uplink service packet sent by the source user plane network element to the source application server.

In some possible implementations, the fourth indication information is a sequence number of the first downlink service packet, and the fifth indication information is a sequence number of the second uplink service packet.

In some possible implementations, that the source application server sends fourth indication information to the source user plane network element includes: The source application server sends the fourth indication information to the source user plane network element by using a source session management network element. That the source application server receives fifth indication information sent by the source user plane network element includes: The source application server receives, by using the source session management network element, the fifth indication information sent by the source user plane network element.

In some possible implementations, after the source application server relocates the context of the terminal apparatus to the target application server corresponding to the target data network access point identifier, the method further includes: The source application server sends a context relocation complete message to a central session management network element, where the context relocation complete message is used to indicate that the source application server and the target application server have completed the relocation of the context of the terminal apparatus.

In some possible implementations, after the source application server relocates the context of the terminal apparatus to the target application server corresponding to the target data network access point identifier, the method further includes: The source application server separately sends a context relocation complete message to a central session management network element and the source session management network element, where the context relocation complete message is used to indicate that the source application server and the target application server have completed the relocation of the context of the terminal apparatus.

According to a fourth aspect, a service packet transmission method is provided. The method includes: A first session management network element receives fourth indication information sent by a source AS, and the first session management network element sends the fourth indication information to a source user plane network element, where the fourth indication information is used to indicate that a first downlink service packet is the last downlink service packet from the source application server; and the first session management network element receives fifth indication information sent by the source user plane network element, and the first session management network element sends the fifth indication information to the source application server, where the fifth indication information is used to indicate that a second uplink service packet is the last uplink service packet sent by the source user plane network element to the source application server.

In some possible implementations, the fourth indication information is a sequence number of the first downlink service packet, and the fifth indication information is a sequence number of the second uplink service packet.

In some possible implementations, the first session management network element is a central session management network element, the central session management network element is configured to control one or more session management network elements, and the one or more session management network elements include a source session management network element.

In some possible implementations, the first session management network element is the central session management network element, and the method further includes: The central session management network element receives a context relocation complete message sent by the source application server, where the context relocation complete message is used to indicate that the source application server and a target application server have completed relocation of a context of the terminal apparatus.

In some possible implementations, the first session management network element is the source session management network element.

In some possible implementations, if the first session management network element is the source session management network element, the method further includes: The first session management network element obtains tunnel information, and sends the tunnel information to the source user plane network element.

In some possible implementations, that if the first session management network element is the source session management network element, the source session management network element obtains tunnel information includes: The source session management network element receives the tunnel information sent by a central session management network element.

According to a fifth aspect, this application provides a service packet transmission apparatus, configured to implement the method according to any one of the first aspect and/or the possible implementations of the first aspect. The apparatus may be a target user plane network element, an apparatus in the target user plane network element, or an apparatus that can be used together with the target user plane network element. In a design, the apparatus may include a module corresponding to performing the method/operation/step/action described in any one of the first aspect and/or the possible implementations of the first aspect. The module may be implemented by a hardware circuit, software, or a combination of a hardware circuit and software. In a design, the apparatus may include a sending unit and a receiving unit.

According to a sixth aspect, this application provides a service packet transmission apparatus, configured to implement the method according to any one of the second aspect and/or the possible implementations of the second aspect. The apparatus may be a source user plane network element, an apparatus in the source user plane network element, or an apparatus that can be used together with the source user plane network element. In a design, the apparatus may include a module corresponding to performing the method/operation/step/action described in any one of the second aspect and/or the possible implementations of the second aspect. The module may be implemented by a hardware circuit, software, or a combination of a hardware circuit and software. In a design, the apparatus may include a sending unit and a receiving unit.

According to a seventh aspect, this application provides a service packet transmission apparatus, configured to implement the method according to any one of the third aspect and/or the possible implementations of the third aspect. The apparatus may be a source application server, an apparatus in the source application server, or an apparatus that can be used together with the source application server. In a design, the apparatus may include a module corresponding to performing the method/operation/step/action described in any one of the third aspect and/or the possible implementations of the third aspect. The module may be implemented by a hardware circuit, software, or a combination of a hardware circuit and software. In a design, the apparatus may include a sending unit and a relocation unit.

According to an eighth aspect, this application provides a service packet transmission apparatus, configured to implement the method according to any one of the fourth aspect and/or the possible implementations of the fourth aspect. The apparatus may be a session management network element, an apparatus in the session management network element, or an apparatus that can be used together with the session management network element. In a design, the apparatus may include a module corresponding to performing the method/operation/step/action described in any one of the fourth aspect and/or the possible implementations of the fourth aspect. The module may be implemented by a hardware circuit, software, or a combination of a hardware circuit and software. In a design, the apparatus may include a receiving unit and a sending unit.

According to a ninth aspect, this application provides a service packet transmission apparatus. The apparatus includes a processor, configured to implement the method according to any one of the first aspect and/or the possible implementations of the first aspect. The apparatus may further include a memory, the memory is coupled to the processor, and the processor is configured to implement the method according to any one of the first aspect and/or the possible implementations of the first aspect. Optionally, the processor is configured to store instructions. When executing the instructions stored in the memory, the processor can implement the method according to any one of the first aspect and/or the possible implementations of the first aspect. The apparatus may further include a communication interface. The communication interface is used by the apparatus to communicate with another device. For example, the communication interface may be a transceiver, a circuit, a bus, a module, a pin, or another type of communication interface.

According to a tenth aspect, this application provides a service packet transmission apparatus. The apparatus includes a processor, configured to implement the method according to any one of the second aspect and/or the possible implementations of the second aspect. The apparatus may further include a memory, the memory is coupled to the processor, and the processor is configured to implement the method according to any one of the second aspect and/or the possible implementations of the second aspect. Optionally, the processor is configured to store instructions. When executing the instructions stored in the memory, the processor can implement the method according to any one of the second aspect and/or the possible implementations of the second aspect. The apparatus may further include a communication interface. The communication interface is used by the apparatus to communicate with another device.

According to an eleventh aspect, this application provides a service packet transmission apparatus. The apparatus includes a processor, configured to implement the method according to any one of the third aspect and/or the possible implementations of the third aspect. The apparatus may further include a memory, the memory is coupled to the processor, and the processor is configured to implement the method according to any one of the third aspect and/or the possible implementations of the third aspect. Optionally, the processor is configured to store instructions. When executing the instructions stored in the memory, the processor can implement the method according to any one of the third aspect and/or the possible implementations of the third aspect. The apparatus may further include a communication interface. The communication interface is used by the apparatus to communicate with another device.

According to a twelfth aspect, this application provides a service packet transmission apparatus. The apparatus includes a processor, configured to implement the method according to any one of the fourth aspect and/or the possible implementations of the fourth aspect. The apparatus may further include a memory, the memory is coupled to the processor, and the processor is configured to implement the method according to any one of the fourth aspect and/or the possible implementations of the fourth aspect. Optionally, the processor is configured to store instructions. When executing the instructions stored in the memory, the processor can implement the method according to any one of the fourth aspect and/or the possible implementations of the fourth aspect. The apparatus may further include a communication interface. The communication interface is used by the apparatus to communicate with another device.

According to a thirteenth aspect, this application provides a service packet transmission system. The system includes at least two of the apparatus according to the fifth aspect, the apparatus according to the sixth aspect, the apparatus according to the seventh aspect, and the apparatus according to the eighth aspect; or the system includes at least two of the apparatus according to the ninth aspect, the apparatus according to the tenth aspect, the apparatus according to the eleventh aspect, and the apparatus according to the twelfth aspect.

According to a fourteenth aspect, this application provides a computer-readable storage medium. The computer-readable storage medium stores computer instructions. When the computer instructions are run on a computer, the computer is enabled to perform the method according to any one of the first aspect and the possible designs of the first aspect.

According to a fifteenth aspect, this application provides a computer-readable storage medium. The computer-readable storage medium stores computer instructions. When the computer instructions are run on a computer, the computer is enabled to perform the method according to any one of the second aspect and the possible designs of the second aspect.

According to a sixteenth aspect, this application provides a computer-readable storage medium. The computer-readable storage medium stores computer instructions. When the computer instructions are run on a computer, the computer is enabled to perform the method according to any one of the third aspect and the possible designs of the third aspect.

According to a seventeenth aspect, this application provides a computer-readable storage medium. The computer-readable storage medium stores computer instructions. When the computer instructions are run on a computer, the computer is enabled to perform the method according to any one of the fourth aspect and the possible designs of the fourth aspect.

According to an eighteenth aspect, this application provides a chip, including a processor. The processor is configured to perform the method according to any one of the first aspect and the possible implementations of the first aspect.

Optionally, the chip further includes a memory, and the memory is coupled to the processor.

Further, optionally, the chip further includes a communication interface.

According to a nineteenth aspect, this application provides a chip, including a processor. The processor is configured to perform the method according to any one of the second aspect and the possible implementations of the second aspect.

Optionally, the chip further includes a memory, and the memory is coupled to the processor.

According to a twentieth aspect, this application provides a chip, including a processor. The processor is configured to perform the method according to any one of the third aspect and the possible implementations of the third aspect.

Optionally, the chip further includes a memory, and the memory is coupled to the processor.

Further, optionally, the chip further includes a communication interface.

According to a twenty-first aspect, this application provides a chip, including a processor. The processor is configured to perform the method according to any one of the fourth aspect and the possible implementations of the fourth aspect.

Optionally, the chip further includes a memory, and the memory is coupled to the processor.

According to a twenty-second aspect, this application provides a computer program product. The computer program product includes computer program code. When the computer program code is run on a computer, the computer is enabled to perform the method according to any one of the first aspect and the possible designs of the first aspect.

According to a twenty-third aspect, this application provides a computer program product. The computer program product includes computer program code. When the computer program code is run on a computer, the computer is enabled to perform the method according to any one of the second aspect and the possible implementations of the second aspect.

According to a twenty-fourth aspect, this application provides a computer program product. The computer program product includes computer program code. When the computer program code is run on a computer, the computer is enabled to perform the method according to any one of the third aspect and the possible designs of the third aspect.

According to a twenty-fifth aspect, this application provides a computer program product. The computer program product includes computer program code. When the computer program code is run on a computer, the computer is enabled to perform the method according to any one of the fourth aspect and the possible implementations of the fourth aspect.

BRIEF DESCRIPTION OF DRAWINGS

FIG. 5 is a schematic diagram of a service packet transmission method according to an embodiment of this application;

FIG. 6 is a schematic diagram of another service packet transmission method according to an embodiment of this application;

DESCRIPTION OF EMBODIMENTS

The following describes the technical solutions in this application with reference to the accompanying drawings.

The technical solutions in the embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

Figure 1:
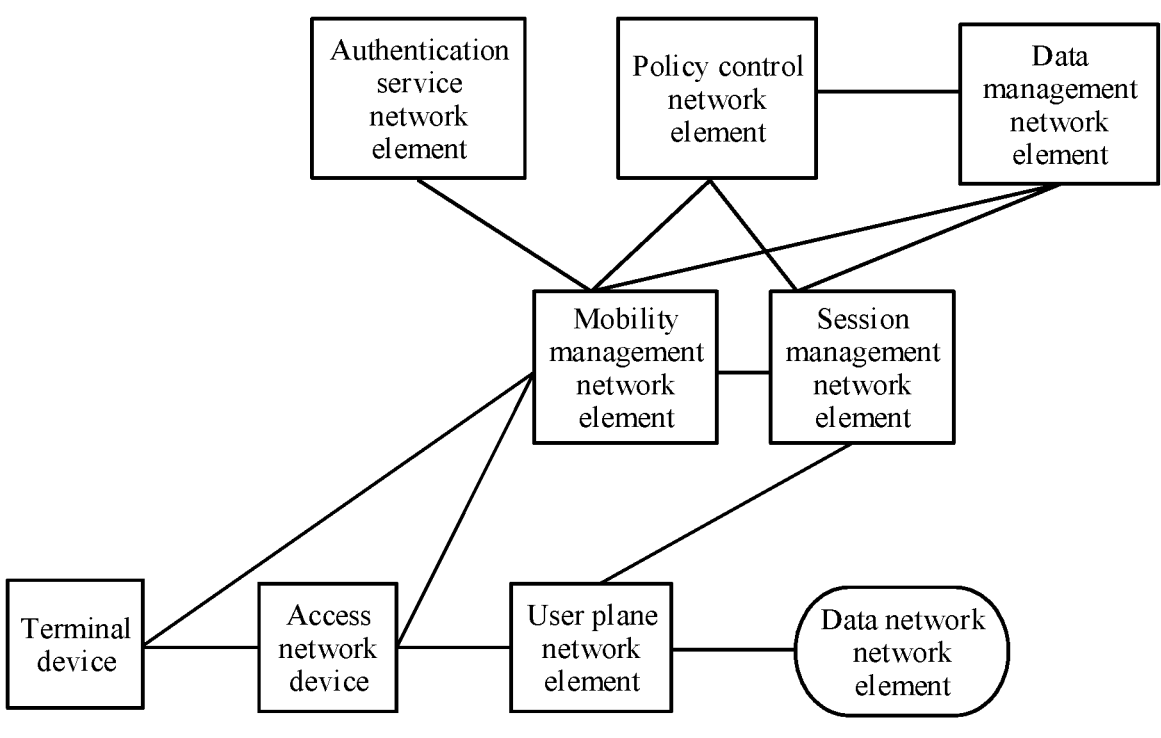
FIG. 1 is a schematic diagram of a system architecture according to an embodiment of this application.

FIG. 1 shows an example of a schematic diagram of an architecture of a communication system according to this application. As shown in FIG. 1, the architecture of the communication system includes a mobility management network element, a session management network element, a policy control network element, an authentication service network element, a data management network element, and a user plane network element. Further, the architecture of the communication system further includes an access network device, a terminal apparatus (user equipment, UE), and a data network (DN) network element. The terminal apparatus may be connected to the mobility management network element. The access network device may also be connected to the mobility management network element. The access network device may further be connected to the user plane network element. The user plane network element may be connected to each of the session management network element and the data network. The mobility management network element may be connected to each of the session management network element, the data management network element, the policy control network element, and the authentication service network element. The session management network element is connected to each of the policy control network element and the data management network element. The mobility management network element and the session management network element each may obtain data, for example, user subscription data, from the data management network element. The mobility management network element and the session management network element each may obtain policy data from the policy control network element. For example, the policy control network element obtains the user subscription data from the data management network element and sends the user subscription data to the mobility management network element and the session management network element. Then, the mobility management network element and the session management network element deliver the user subscription data to the access network device, the terminal apparatus, the user plane network element, and the like.

The mobility management network element is mainly used for registration, mobility management, and a tracking area update procedure for a terminal apparatus in a mobile network. The mobility management network element terminates a non-access stratum (NAS) message, completes registration management, connection management, and reachability management, tracking area list (TA list) allocation, mobility management, and the like, and transparently routes a session management (SM) message to the session management network element. In 5th generation (5G) communication, the mobility management network element may be a core network access and mobility management function (AMF) network element. In future communication, for example, 6th generation (6G) communication, the mobility management network element may still be an AMF network element or have another name. This is not limited in this application.

The session management network element is mainly used for session management, for example, session creation, modification, and release, in a mobile network. Specific functions include, for example, allocating an internet protocol (IP) address to a user, or selecting a user plane network element that provides a packet forwarding function. In 5G, the session management network element may be a session management function (SMF) network element. In future communication, for example, 6G, the session management network element may still be the SMF network element or have another name. This is not limited in this application.

The policy control network element has a user subscription data management function, a policy control function, a charging policy control function, quality of service (QoS) control, and the like. In 5G, the policy control network element may be a policy control function (PCF) network element. In future communication, for example, 6G, the policy control network element may still be the PCF network element or have another name. This is not limited in this application.

The authentication server network element is mainly configured to use an extensible authentication protocol (EAP) to verify a service function and store a key, so as to implement authentication and authorization on a user. In 5G, the authentication server network element may be an authentication server function (AUSF) network element. In future communication, for example, 6G, the user plane network element may still be the AUSF network element or have another name. This is not limited in this application.

The data management network element is mainly configured to store user data, such as subscription information and authentication/authorization information. In 5G, the data management network element may be a unified data management (UDM) network element. In future communication, for example, 6G, the data management network element may still be the UDM network element or have another name. This is not limited in this application.

The user plane network element is mainly used for user plane service processing, for example, service routing, packet forwarding, an anchoring function, quality of service (QoS) mapping and execution, identification of an identifier of an uplink and routing to a data network, triggering of a notification of downlink packet buffering and downlink data arrival, and connecting to an external data network. There may be a plurality of user plane network elements, where a user plane network element connected to an application server (AS) is referred to as a protocol data unit session anchor (PDU session anchor, PSA), and the PDU is short for protocol data unit. In 5G, the user plane network element may be a user plane function (UPF) network element. In future communication, for example, 6G, the user plane network element may still be the UPF network element or have another name. This is not limited in this application.

The access network device may also be referred to as a radio access network (RAN) device, and is a device that provides a wireless communication function for the terminal apparatus. The access network device includes but is not limited to: a next generation gNodeB (gNB), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like in 5G.

The terminal apparatus (user equipment, UE) is a device having wireless transmission and reception functions. The terminal apparatus may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). The terminal apparatus may be a mobile phone, a tablet (pad), a computer having wireless transmission and reception functions, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

The data network (DN) is mainly used to provide a service for a user, for example, a service of a carrier, an internet access service, or a third-party service.

It may be understood that the foregoing network elements or functions may be network elements in a hardware device, may be software functions running on dedicated hardware, or may be virtualized functions instantiated on a platform (for example, a cloud platform). One or more services may be obtained through division based on the foregoing network elements or functions. Further, a service independent of a network function may exist. In this application, an instance of the function, an instance of a service included in the function, or an instance of a service that exists independently of a network function may be referred to as a service instance.

It should be noted that a name of each network element included in FIG. 1 is merely a name, and the name does not limit a function of the network element. In a 5G network and another future network, the foregoing network elements may alternatively have other names. This is not specifically limited in the embodiments of this application. For example, in a 6G network, some or all of the foregoing network elements may still use terms in 5G, or may use other names, or the like. This is uniformly described herein. Details are not described in the following.

It should be noted that the network elements in FIG. 1 do not necessarily exist at the same time, and a required network element may be determined based on a requirement. A connection relationship between the network elements in FIG. 1 is not uniquely determined, and may be adjusted based on a requirement.

In this application, an example in which the user plane network element is the UPF, for example, a source UPF and a target UPF, is used for description. Optionally, the source UPF may be replaced with a source PSA, and the target UPF may be replaced with a target PSA. In this application, an example in which the session management network element is the SMF network element is used for description.

Figure 2:
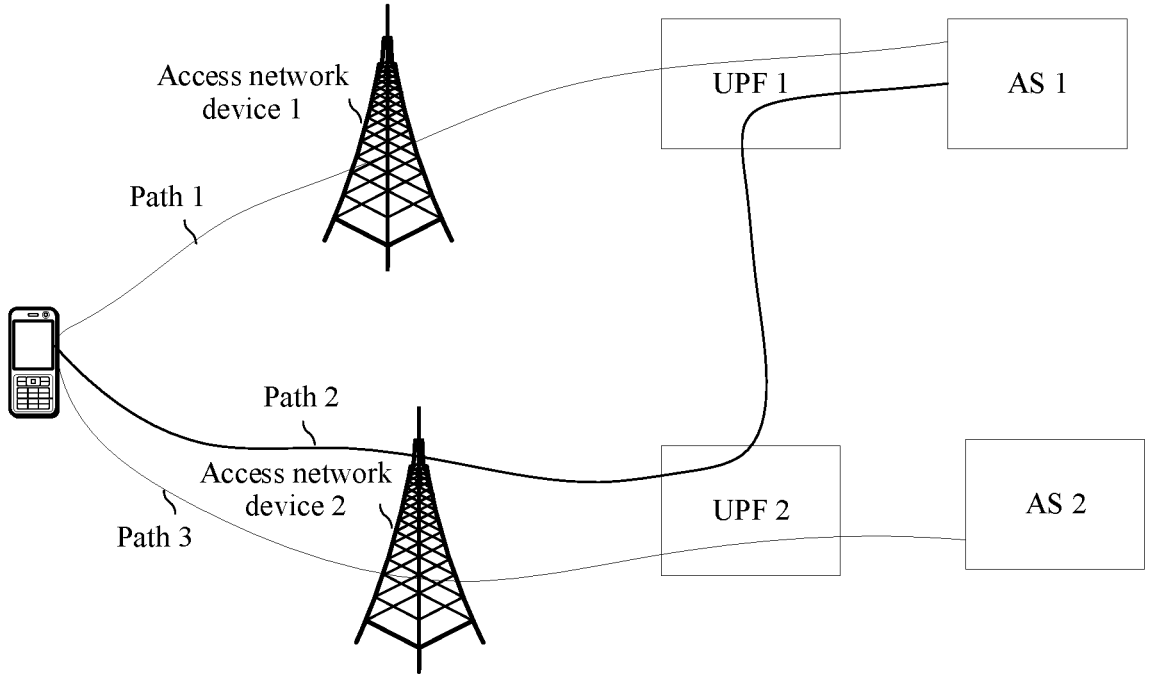
FIG. 2 is a schematic diagram of an application scenario according to an embodiment of this application.

FIG. 2 is a schematic diagram of an application scenario according to an embodiment of this application. FIG. 2 shows three transmission paths. An uplink service packet transmission process of a path 1 is: terminal apparatus-access network device 1-UPF 1-AS 1, and a downlink service packet transmission process is an inverse process of the uplink service packet transmission process. An uplink service packet transmission process of a path 2 is: terminal apparatus-access network device 2-UPF 2-UPF 1-AS 1, and a downlink service packet transmission process is an inverse process of the uplink service packet transmission process. An uplink service packet transmission process of a path 3 is: terminal apparatus-access network device 2-UPF 2-AS 2, and a downlink service packet transmission process is an inverse process of the uplink service packet transmission process. In a process in which the terminal apparatus (for example, a terminal device in FIG. 1) transmits a service packet through the path 1, a location of the terminal apparatus changes. When the terminal apparatus moves from a location covered by the access network device 1 to a location covered by the access network device 2, the terminal apparatus needs to be handed over to the access network device 2, that is, air interface handover is performed. In this case, the service packet is transmitted through the path 2. The packet on the path 2 arrives at the UPF 2 by using the access network device 2 and then arrives at the UPF 1 (also referred to as a source UPF), and finally arrives at the AS 1. In this case, a transmission distance is relatively long, because the path 2 is the longest among the three transmission paths, a latency of the packet transmitted on the path 2 is relatively high. For example, for a packet of an ultra-reliable low-latency communication (URLLC) type, a low-latency requirement cannot be satisfied on the path 2. Therefore, it is necessary to switch the transmission path of the packet from the path 2 to the path 3; in other words, it is necessary to relocate a context of the terminal apparatus from the AS 1 to the AS 2. However, in a process of switching the transmission path of the packet from the path 2 to the path 3, the packet that is being transmitted on the path 2 may be lost due to a path switching operation. In this case, a packet loss rate is relatively high, and transmission performance is relatively poor. In addition, during path switching, the UPF 2 (also referred to as a target UPF) may simultaneously receive uplink service packets from the path 2 and the path 3. As a result, the packets received by the UPF 2 are out of order. This is a big problem for a service type that has a strict requirement on a packet order.

For the foregoing problem, according to a service packet transmission method provided in the embodiments of this application, a source UPF and a target UPF are interacted. For a specific interaction process, refer to descriptions in the following embodiments. In a path switching process, an uplink service packet on the path 2 is accurately transmitted to the AS 2, and a downlink service packet on the path 2 is accurately transmitted to the terminal apparatus.

It should be noted that FIG. 2 is a simplified schematic diagram of packet transmission when the UPF changes. In an actual transmission process, another network element may further exist in FIG. 2. Because the another network element is irrelevant to this application, no detailed descriptions are provided.

It should be noted that transmission of an uplink service packet and transmission of a downlink service packet are described together in this application. However, this is not limited in the embodiments of this application. In an actual processing process, only transmission of an uplink service packet may exist, or only transmission of a downlink service packet may exist.

It should be noted that, for ease of description, "network element" is deleted. For example, the UPF represents the UPF network element, and the SMF represents the SMF network element.

Figure 3:
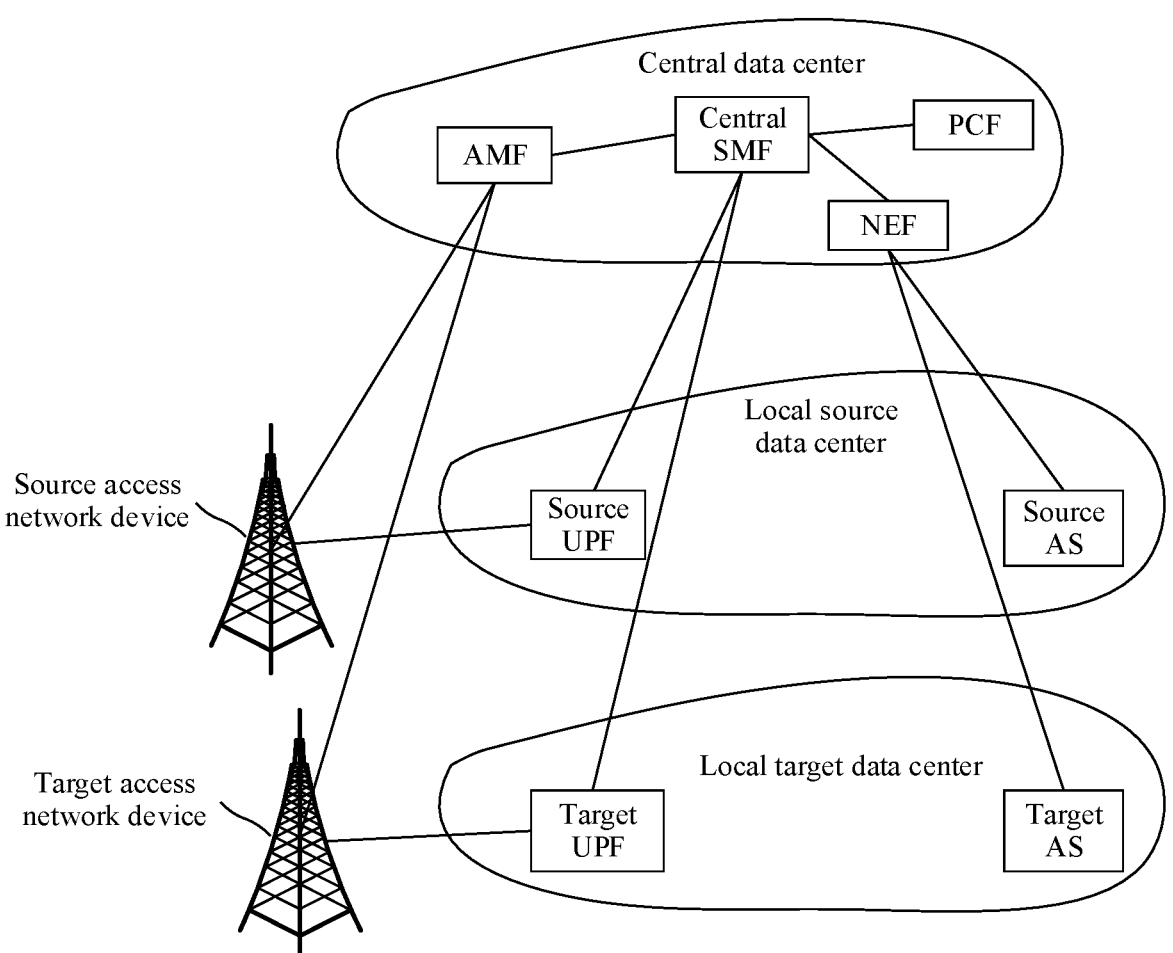
FIG. 3 is a schematic diagram of another application scenario according to an embodiment of this application.
Figure 4:
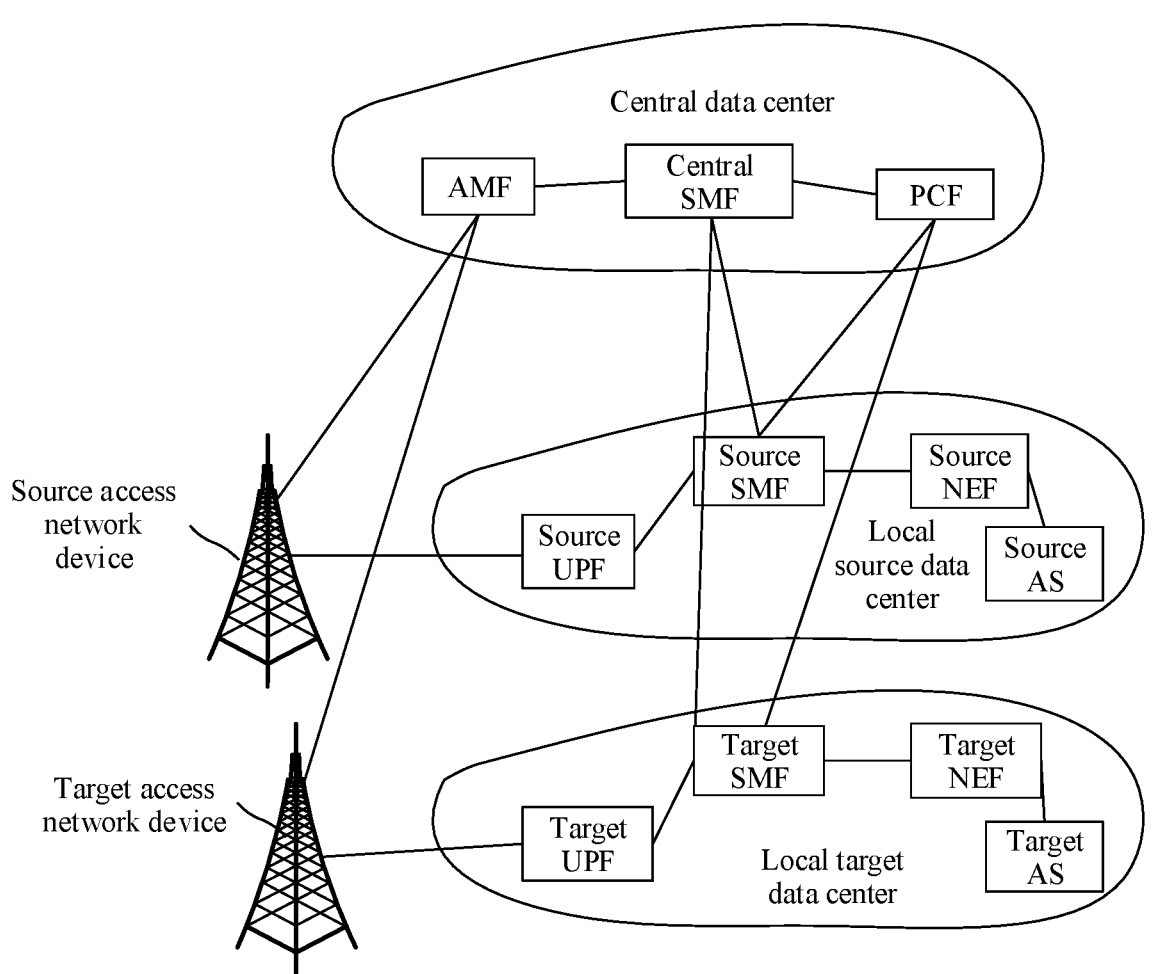
FIG. 4 is a schematic diagram of still another application scenario according to an embodiment of this application.

The following describes two application scenarios of the embodiments of this application with reference to FIG. 3 and FIG. 4.

As shown in FIG. 3, a central data center controls one or more local data centers. FIG. 3 shows only two local data centers (also referred to as a local source data center and a local target data center). However, this is not limited in the embodiments of this application. There is no SMF in each local data center.

Specifically, the central data center includes a central SMF, a PCF, an NEF, and an AMF. The central SMF is configured to obtain policy data from the PCF, and control a source UPF and a target UPF based on the policy data. For example, when a location of a terminal apparatus changes, to be specific, the terminal apparatus moves from coverage of a source access network device to coverage of a target access network device, the terminal apparatus performs air interface handover, and is handed over from the source access network device to the target access network device. In this case, the AMF may obtain access information that is of the terminal apparatus and that is sent by the target access device, and report the access information of the terminal apparatus to the central SMF. The access information includes location information of the terminal apparatus. The central SMF determines, based on the access information of the terminal apparatus, that a user plane network element of the terminal apparatus needs to be handed over. When finding that an application server corresponding to a user plane network element that needs to be handed over to also changes, the central SMF determines a data network access point identifier (DNAI) of a target AS. The central SMF sends the DNAI of the target AS and an identifier of the terminal apparatus to a source AS (optionally, the central SMF may alternatively send an identifier of an application of the terminal apparatus to the source AS), so that the source AS determines the target AS based on the DNAI. Therefore, the source AS relocates a context of the terminal apparatus to the target AS. For example, the central SMF performs signaling transmission with the source AS and the target AS by using the NEF.

It should be noted that, in FIG. 3, the central data center may further include an AF. The central SMF may interact with the source AS and the target AS by using the AF, and the central SMF may interact with the AF by using the NEF.

As shown in FIG. 4, a central data center controls one or more local data centers. FIG. 4 shows only two local data centers (also referred to as a local source data center and a local target data center). However, this is not limited in the embodiments of this application. Each local data center has an SMF and an NEF. For example, the source data center includes a source SMF and a source NEF, and the target data center includes a target SMF and a target NEF. A central SMF is configured to control the source SMF and the target SMF.

Specifically, the central data center includes the central SMF. The central SMF is configured to obtain policy data from a PCF, and control the source SMF and the target SMF based on the policy data. For example, when a location of a terminal apparatus changes, to be specific, the terminal apparatus moves from coverage of a source access network device to coverage of a target access network device, the terminal apparatus performs air interface handover, and is handed over from the source access network device to the target access network device. In this case, an AMF may obtain access information that is of the terminal apparatus and that is sent by the target access device, and report the access information of the terminal apparatus to the central SMF. The central SMF determines, based on the policy data obtained from the PCF, that a UPF of the terminal apparatus needs to be handed over. When finding that an application server corresponding to a target UPF that needs to be handed over to also changes, the central SMF determines a data network access point identifier (DNAI) of a target AS. The central SMF sends the DNAI of the target AS and an identifier of the terminal apparatus to a source AS (optionally, the central SMF may alternatively send an identifier of an application of the terminal apparatus to the source AS), so that the source AS determines the target AS based on the DNAI. Therefore, the source AS relocates a context of the terminal apparatus to the target AS. For example, the central SMF performs signaling transmission with the source AS and the target AS by using the NEF. Optionally, the central SMF may alternatively directly perform signaling transmission with the source AS or the target AS.

It should be noted that, in FIG. 4, the central data center may further include a control plane network element AF of an AS. The central SMF may interact with the source AS and the target AS by using the AF, and the central SMF may interact with the AF by using the NEF. The source SMF may interact with the AF through the source NEF, and the source SMF may interact with the source AS through the source NEF. The target SMF may interact with the AF through the target NEF, and the target SMF may interact with the target AS through the target NEF. To avoid repetition, the AF is not shown in this embodiment of this application.

In a possible implementation, the local source data center may include a source UPF, a source SMF, a source AF, and a source AS. The local target data center may include a target PSA, a target SMF, a target AF, and a target AS. The source SMF may interact with the source AS by using the source AF, and the target SMF may interact with the target AS by using the target AF.

Optionally, the relocation of the context of the terminal apparatus in this application may be relocation of a context status of the terminal apparatus. For example, the context status includes an application layer status and a transport layer status, to be specific, the application layer status and the transport layer status of the terminal apparatus are relocated from the source AS to the target AS. The relocation of the context of the terminal apparatus in this application may alternatively be relocation of an application instance of the terminal, to be specific, one application instance serves only one terminal apparatus, and the relocation of the context of the terminal apparatus is relocation of the application instance from the source AS to the target AS.

With reference to FIG. 5, the following describes a service packet transmission method 200 according to an embodiment of this application. The method 200 includes the following steps.

S210: After receiving a second uplink service packet, a source UPF receives a first uplink service packet, where the second uplink service packet is the last uplink service packet sent by the source UPF to a source application server.

S220: The source UPF sends the first uplink service packet to a target UPF, and the target UPF receives the first uplink service packet sent by the source UPF. It should be noted that in this embodiment of this application, the first uplink service packet may be one or more uplink service packets that are from the source UPF and that need to be sent to the target UPF. In other words, the first uplink service packet may be an uplink service packet that is not processed completely in a path switching process, namely, an uplink service packet that cannot be sent to a source AS based on an original path, but has arrived at the source UPF. To avoid loss of the packet, the first uplink service packet may be sent to the target UPF.

S230: The source UPF sends first indication information to the target UPF, and the target UPF receives the first indication information from the source UPF. The first indication information is used to indicate that the sending of the first uplink service packet by the source UPF ends.

Optionally, the source UPF may simultaneously send the first uplink service packet in S220 and the first indication information in S230 to the target UPF. For example, if the first uplink service packet is the last uplink service packet sent by the source UPF to the target UPF, the first indication information may be encapsulated into a packet header of the first uplink service packet and sent to the target UPF. Optionally, the source UPF may alternatively first send the first uplink service packet, and then send an uplink packet carrying the first indication information. For example, the uplink packet carrying the first indication information has a same data packet format as the first uplink service packet. For example, the first uplink service packet is a general packet radio service tunneling protocol (GPRS tunneling protocol, GTP) data packet, where the GPRS represents a general packet radio service, and the GTP data packet includes a general packet radio service for the user plane (GTP for the user plane, GTP-U) header. In this case, the uplink packet carrying the first indication information is also a GTP data packet, and the first indication information may be set in a specific flag bit of a GTP-U header. For example, the specific flag bit is set to "0" or "1". Except for the specific flag bit, the GTP-U header of the uplink packet carrying the first indication information is completely the same as that of the first uplink service packet.

S240: After the target UPF receives the first indication information and the first uplink service packet is sent, the target UPF sends a target AS an uplink service packet that is sent by an access network device to the target UPF.

Therefore, in this embodiment of this application, after sending the last second uplink service packet to the source AS, the source UPF sends the first uplink service packet received after the second uplink service packet to the target AS by using the target UPF, preventing loss of the first uplink service packet. In addition, the source UPF may send the first indication information to the target UPF, to indicate that the sending of the first uplink service packet by the source UPF ends. In this way, the target UPF can be prevented from keeping waiting to receive an uplink service packet sent by the source UPF. After receiving the first indication information, and after sending the target AS the uplink service packet that is from the source UPF, the target UPF sends the uplink service packet that is sent by the access network device to the target UPF, to avoid out-of-order of uplink service packets.

FIG. 6 shows a service packet transmission method 300 according to an embodiment of this application. The method 300 includes the following steps.

S310: A source application server (AS) receives first notification information sent by a session management function SMF, where the first notification information is used to notify that a data network access point identifier (DNAI) changes or is used to notify that an anchor UPF changes, and the first notification information includes a target data network access point identifier (DNAI) and an identifier of a terminal apparatus.

For example, in the scenario shown in FIG. 3, in S310, the source AS receives the first notification information sent by the central SMF.

S320: After the source AS determines that processing of a first downlink service packet and a second uplink service packet is complete, the source AS relocates a context of the terminal apparatus to a target AS corresponding to the target DNAI, where the first downlink service packet is the last downlink service packet sent by the source AS to a source user plane function UPF, and the second uplink service packet is the last uplink service packet sent by the source UPF to the source application server (AS).

In this embodiment of this application, after receiving the first notification information sent by the SMF network element, the source AS may determine that the context of the terminal apparatus needs to be relocated. After determining that the context of the terminal apparatus needs to be relocated, and after the source AS determines that the last downlink service packet (the first downlink service packet) and the last received uplink service packet (the second uplink service packet) are processed, the source AS determines the corresponding target AS based on the target DNAI in the first notification information, and relocates the context of the terminal apparatus to the target AS. In this way, after the context of the terminal apparatus is relocated to the target AS, continuous transmission of uplink and downlink service packets of the terminal apparatus can be ensured.

It should be noted that, the context relocation of the terminal apparatus in the embodiments of this application may be overall relocation of a specific application instance of the terminal apparatus. For example, when one application instance serves only one terminal apparatus, the context relocation is relocating an entire application instance that is of the terminal apparatus and that is related to a data network (DN) from one AS (a source AS) to another AS (a target AS); or the context relocation of the terminal apparatus may be relocating contexts of a transport layer and an application layer of the terminal apparatus. For example, when a plurality of terminal apparatuses share one application instance, the context relocation of the terminal apparatus is relocating, from one AS (a source AS) to another AS (a target AS), contexts of a transport layer and an application layer of an application that is of the terminal apparatus and that needs to be relocated.

Figure 7A:
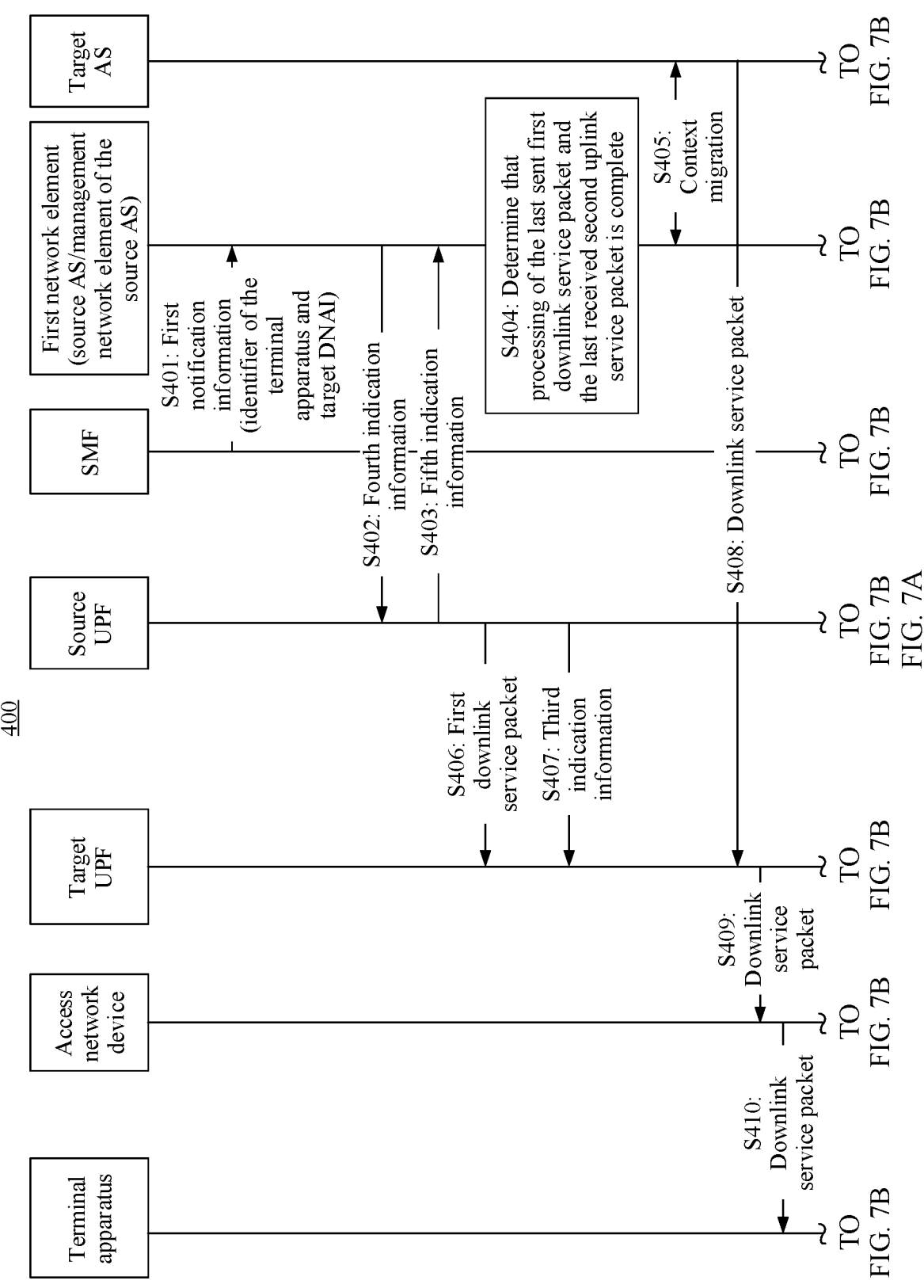
FIG. 7A and FIG. 7B are a schematic diagram of still another service packet transmission method according to an embodiment of this application.
Figure 7B:
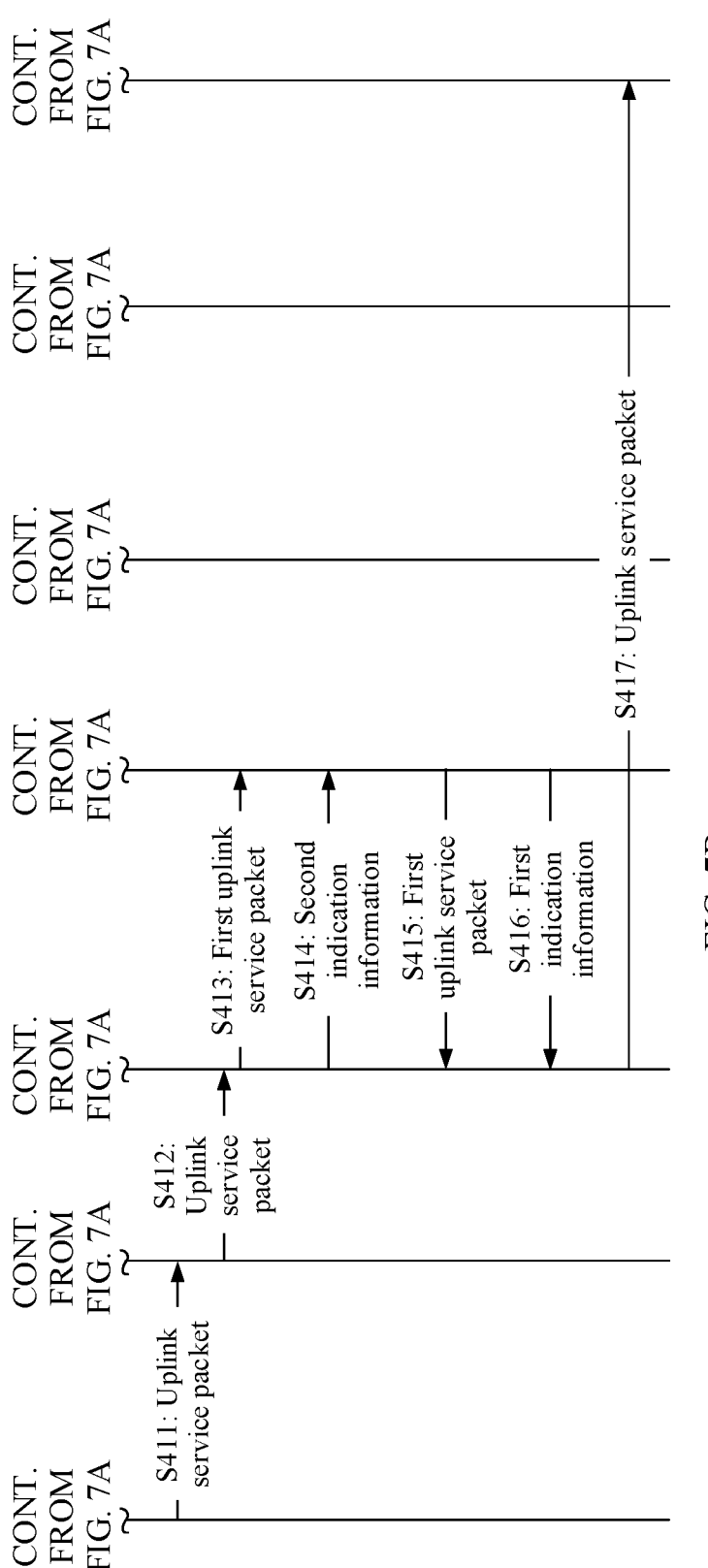

FIG. 7A and FIG. 7B show a service packet transmission method 400 according to an embodiment of this application. The method 400 includes the following steps.

S401: An SMF sends first notification information to a first network element, and the first network element receives the first notification information sent by the SMF, where the first notification information is used to notify that a data network access point identifier (DNAI) changes or is used to notify that a UPF changes, and the first notification information includes a target data network access point identifier (DNAI) and an identifier of a terminal apparatus.

Optionally, the first network element may be a source AS, a management network element of the source AS, or a control plane network element AF of the source AS. If the first network element is the management network element of the source AS or the control plane network element AF of the source AS, after the SMF sends the first notification information to the management network element of the source AS or the control plane network element AF of the source AS, the management network element of the source AS or the control plane network element AF of the source AS forwards the first notification information to the source AS. The following uses an example in which the first network element is the source AS for description.

S402: After receiving the first notification information, the source AS determines that the last downlink service packet sent by the source AS to a source UPF is a first downlink service packet, the source AS sends fourth indication information to the source UPF, and the source UPF receives the fourth indication information sent by the source AS, where the fourth indication information is used to indicate that the first downlink service packet is the last downlink service packet from the source AS. For example, the fourth indication information may be a sequence number of the first downlink service packet.

Optionally, before sending the fourth indication information to the source UPF, the source AS may send the first downlink service packet to the source UPF. Optionally, after sending the fourth indication information to the source UPF, the source AS sends the first downlink service packet to the source UPF. Optionally, the source AS simultaneously sends the fourth indication information and the first downlink service packet to the source UPF. For example, the fourth indication information may be included in a packet header of the first downlink service packet. Regardless of a sending order of the fourth indication information and the first downlink service packet, the source AS no longer sends a downlink service packet to the source UPF after sending the first downlink service packet to the source UPF.

Optionally, in S402, after receiving the first notification information, the source AS may pre-freeze a context of the terminal apparatus, for example, interact with a target AS to prepare to relocate the context of the terminal apparatus. In this way, duration of the relocation of the context of the terminal apparatus can be shortened.

S403: After receiving the fourth indication information sent by the source AS, the source UPF sends fifth indication information to the source AS, and the source AS receives the fifth indication information sent by the source UPF, where the fifth indication information is used to indicate that a second uplink service packet is the last uplink service packet sent by the source UPF to the source AS. For example, the fifth indication information may be a sequence number of the second uplink service packet.

Optionally, in S402 and S403, the source AS may send the fourth indication information to the source UPF by using the control plane network element AF of the source AS and the control plane network element SMF of the source UPF. To be specific, the source AS first sends the fourth indication information to the AF, the AF sends the fourth indication information to the SMF, and the SMF sends the fourth indication information to the source UPF. Optionally, the source UPF may also send the fifth indication information to the source AS by using the SMF and the AF. To be specific, the source user plane network element sends the fifth indication information to the control plane network element SMF of the source UPF, the SMF sends the fifth indication information to the AF, and the AF sends the fifth indication information to the source AS.

It should be noted that an order of sending the second uplink service packet and the fifth indication information by the source UPF to the source AS is not limited in this embodiment of this application. To be specific, after sending the second uplink service packet to the source AS, the source UPF may send the fifth indication information to the source AS; or after receiving the second uplink service packet, the source UPF may first send the fifth indication information to the source AS, and then send the second uplink service packet; or after receiving the second uplink service packet, the source UPF may simultaneously send the second uplink packet and the fifth indication information to the source AS.

Optionally, the source AS may directly send the fourth indication information to the source UPF, and the source UPF may directly send the fifth indication information to the source AS. This is not limited in this embodiment of this application.

S404: After receiving the fifth indication information, the source AS may determine that the second uplink service packet is the last uplink service packet from the source UPF, and the source AS determines that processing of the first downlink service packet and the second uplink service packet is complete.

Specifically, after receiving the second uplink service packet and replying with an acknowledgment message of the second uplink service packet, the source AS may determine that the processing of the second uplink service packet is complete. After sending the first downlink service packet and receiving an acknowledgment message of the first downlink service packet, the source AS may determine that the processing of the first downlink service packet is complete. Alternatively, when receiving the second uplink service packet, the source AS may consider that the processing of the second uplink service packet is complete; after sending the first downlink service packet, the source AS may consider that the processing of the first downlink service packet is complete.

S405: After processing the first downlink service packet and the second uplink service packet, the source AS relocates the context of the terminal apparatus to the target AS corresponding to the target DNAI.

S406: After receiving the first downlink service packet sent by the source AS, the source UPF sends the first downlink service packet to a target UPF.

S407: The source UPF sends third indication information to the target UPF, where the third indication information is used to indicate that the sending of the downlink service packet that is from the source AS ends.

It should be noted that an order of S406 and S407 is not limited. Optionally, the source UPF may first send the first downlink service packet, and then send a downlink packet carrying the third indication information. The downlink packet carrying the third indication information has a same data packet format as the first downlink service packet. For example, if the first downlink service packet is a GTP data packet and includes a GTP-U header, the downlink packet carrying the third indication information is also a GTP data packet, and the third indication information may be set in a specific flag bit of a GTP-U header. For example, the specific flag bit is set to "0" or "1". Except for the specific flag bit, the GTP-U header of the downlink packet carrying the third indication information is the same as that of the first downlink service packet. Optionally, the source UPF may simultaneously send the first downlink service packet and the third indication information to the target UPF, for example, encapsulate the third indication information into a packet header of the first downlink service packet. It should further be noted that the context relocation between the source AS and the target AS and the sending of the first downlink service packet and the third indication information from the source UPF to the target UPF may be performed simultaneously or sequentially. In other words, S404 and S405 may be performed before, after, or simultaneously with S406 and S407.

S408: After the source AS and the target AS complete the relocation of the context of the terminal apparatus, and after a link between the target AS and the target UPF is established, the target AS may send a downlink service packet of the terminal apparatus to the target UPF.

S409: If the target UPF receives both the first downlink service packet from the source UPF and the downlink service packet that is from the target AS, the target UPF immediately sends, to an access network device, the first downlink service packet that is from the source AS. If the target UPF has a downlink service packet from the target AS before receiving the third indication information, the target UPF buffers the downlink service packet that is from the target AS. After receiving the third indication information, and after determining that the first downlink service packet is sent to the access network device, the target UPF sends, to the access network device, the downlink service packet that is from the target AS (the downlink service packet in S408). In this way, it can be ensured that the downlink service packet from the source AS is preferentially transmitted, and then the downlink service packet from the target AS is transmitted. This prevents downlink service packets from being out of order.

S410: The access network device sends the downlink service packet received in S409 to the terminal apparatus through an air interface.

S411: The terminal apparatus does not sense network element handover on a network side, and the terminal apparatus may also send an uplink service packet to the access network device when receiving the downlink service packet.

It should be noted that an order of S411 and any one of the foregoing steps is not limited. When the terminal apparatus needs to send the uplink service packet, S411 is performed, and no order limitation is imposed.

S412: The access network device sends, to the target UPF, the uplink service packet that is from the terminal apparatus.

Similarly, S412 only needs to be performed after S411, and an order of S412 and the foregoing other steps is not limited. When receiving the uplink service packet sent by the terminal apparatus, and the access network device needs to send the uplink service packet to the target UPF, S412 is performed, and no order limitation is imposed.

S413: After receiving the uplink service packet sent by the access network device, the target UPF sends a first uplink service packet to the source UPF, where the target UPF no longer sends an uplink service packet to the source UPF after receiving the third indication information.

S414: After receiving the third indication information, the target UPF sends second indication information to the source UPF, where the second indication information is used to indicate that the sending of the first uplink service packet by the target UPF ends, that is, the target UPF no longer sends the uplink service packet to the source UPF.

It should be noted that first indication information and the second indication information may be signaling between different network elements, but the first indication information and the second indication information may include a same information element, to be specific, the same information element may be an identifier indicating that the sending of the uplink service packet ends. In other words, after the target user plane network element sends the second indication information to the source user plane network element, the source user plane network element may determine that the sending of the uplink service packet that is from the target user plane network element ends. After the source user plane network element sends the first indication information to the target user plane network element, the target user plane network element may determine that the sending of the uplink service packet that is from the source user plane network element ends.

In an alternative manner of S414, after receiving the downlink service packet from the target AS or receiving a context relocation complete message sent by the session management function SMF, the target UPF sends the second indication information to the source UPF.

In other words, the target UPF may send the second indication information to the source UPF in two cases. Case 1: After receiving the third indication information sent by the source UPF, the target UPF sends the second indication information to the source UPF. Case 2: After receiving the downlink service packet from the target AS or receiving the context relocation complete message sent by the SMF, the target UPF sends the second indication information to the source UPF.

Optionally, the second indication information may be sent after the last first uplink service packet, to be specific, the target UPF first sends the first uplink service packet to the source UPF, and then sends an uplink packet carrying the second indication information. The uplink packet carrying the second indication information has a same data packet format as the first uplink service packet. For example, if the first uplink service packet is a GTP data packet and includes a GTP-U header, the uplink packet carrying the second indication information is also a GTP data packet, and the second indication information may be set in a specific flag bit of a GTP-U header. For example, the specific flag bit is set to "0" or "1". Except for the specific flag bit, the GTP-U header of the downlink packet carrying the second indication information is completely the same as that of the first uplink service packet. Optionally, the target UPF may alternatively encapsulate the second indication information into a packet header of the last first uplink service packet and send the first uplink service packet to the source UPF.

S415: After sending the fifth indication information to the source AS, and when receiving the first uplink service packet from the target UPF, the source UPF forwards the first uplink service packet to the target UPF.

S416: After receiving the second indication information from the target UPF, the source UPF sends first indication information to the target UPF. In this way, the target UPF may determine, by using the first indication information, that sending of the uplink service packet that is from the source UPF ends. In other words, the target UPF first sends the second indication information to the source UPF to indicate that sending of the first uplink service packet that is sent by the target UPF ends. The source UPF may send an information element of the second indication information as an information element of the first indication information to the target UPF. In this way, the target UPF can learn that the sending of the first uplink service packet that is from the source UPF also ends. Certainly, the first indication information and the second indication information are used to distinguish between signaling between different network elements. In an actual processing process, the first indication information and the second indication information may alternatively be same indication information. To be specific, the target UPF first sends the indication information to the source UPF, and then the source UPF sends the indication information to the target UPF. In other words, the first indication information or the second indication information may indicate that sending of an uplink service packet on an original path or an old path ends. The original path or the old path is as follows: target UPF-source UPF-target UPF. Regardless of whether the source UPF receives the second indication information or the target UPF receives the first indication information, the source UPF and the target UPF may determine that there is no uplink service packet on the original path or the old path any longer.

It should be noted that the source UPF sequentially sends the first uplink service packet and the first indication information to the target UPF, to be specific, the source UPF sends the first uplink service packet and the first indication information to the target UPF in an order of receiving the first uplink service packet and the second indication information. An order of the second indication information and the first uplink service packet (S413 and S414) is the same as an order of the first indication information and the first uplink service packet (S415 and S416). In other words, if the first uplink service packet in S413 is before the second indication information in S414, the first uplink service packet in S415 is also before the first indication information in S416. If the first uplink service packet and the second indication information in S413 and S414 are simultaneously sent, the first uplink service packet and the first indication information in S415 and S416 are also simultaneously sent.

S417: After the target UPF establishes an uplink to the target AS, the target UPF may send the uplink service packet to the target AS. Specifically, a sending process is that the first uplink service packet, namely, the uplink service packet from the source UPF, is first sent, and then the uplink service packet directly from the access network device is sent.

To better describe S412 to S417, the following provides an example for description. It is assumed that in S412, service packets sequentially sent by the access network device to the target UPF are a packet 1, a packet 2, a packet 3, a packet 4, and a packet 5, the target UPF sequentially receives the five packets, and the target UPF sequentially sends the packet 1, the packet 2, and the packet 3 to the source UPF. The following describes two cases. Case 1: When receiving the third indication information sent by the source UPF, the target UPF determines that the target UPF no longer sends an uplink service packet to the source UPF, to be specific, the target UPF sends the second indication information to the source UPF, to indicate that the sending of the uplink service packet that is from the target UPF ends. The target UPF first buffers the packet 4 and the packet 5. In this case, the packet 1, the packet 2, and the packet 3 are first uplink service packets. After sequentially receiving the packet 1, the packet 2, the packet 3, and the second indication information, the source UPF sequentially sends the packet 1, the packet 2, the packet 3, and the first indication information (a position of the first indication information in the packets is the same as that of the second indication information in the packets) to the target UPF. After sequentially sending the packet 1, the packet 2, and the packet 3 to the target AS, receiving the first indication information, and sequentially sending the packet 1, the packet 2, and the packet 3 to the target AS, the target UPF sends the buffered packet 4 and packet 5. Case 2: When receiving the third indication information sent by the source UPF, the target UPF determines that a service packet last sent to the source UPF is the packet 4, encapsulates the second indication information into a packet header of the packet 4, and sends the packet 4 to the source UPF. The target UPF first buffers the packet 5. In this case, the packet 1, the packet 2, the packet 3, and the packet 4 are first uplink service packets. After sequentially receiving the packet 1, the packet 2, the packet 3, and the packet 4, the source UPF sequentially sends the packet 1, the packet 2, the packet 3, and the packet 4 (where in this case, the second indication information in the packet 4 is replaced with the first indication information) to the target UPF. The target UPF sequentially sends the packet 1, the packet 2, the packet 3, and the packet 4 to the target AS. After parsing out the first indication information from the packet header of the packet 4, and after sequentially sending the packet 1, the packet 2, the packet 3, and the packet 4 to the target AS, the target UPF sends the buffered packet 5.

It should be noted that the first uplink service packet is an uplink service packet that has been sent to the source UPF but has not been forwarded to the source AS in a context relocation process of the terminal apparatus. A packet that has been sent to the source UPF may also be referred to as a packet on an old path or an original path. In this case, the packet on the old path or the original path needs to be forwarded to the target UPF, and forwarded to the target AS by using the target UPF, to avoid loss of the uplink service packet. In addition, the first indication information is used to indicate that sending of the packet on the old path or the original path ends. In this way, the target UPF ensures that the uplink service packet from the access network device is sent after the uplink service packet on the old path or the original path is sent. This can avoid out-of-order of uplink service packets.

Figure 8A:
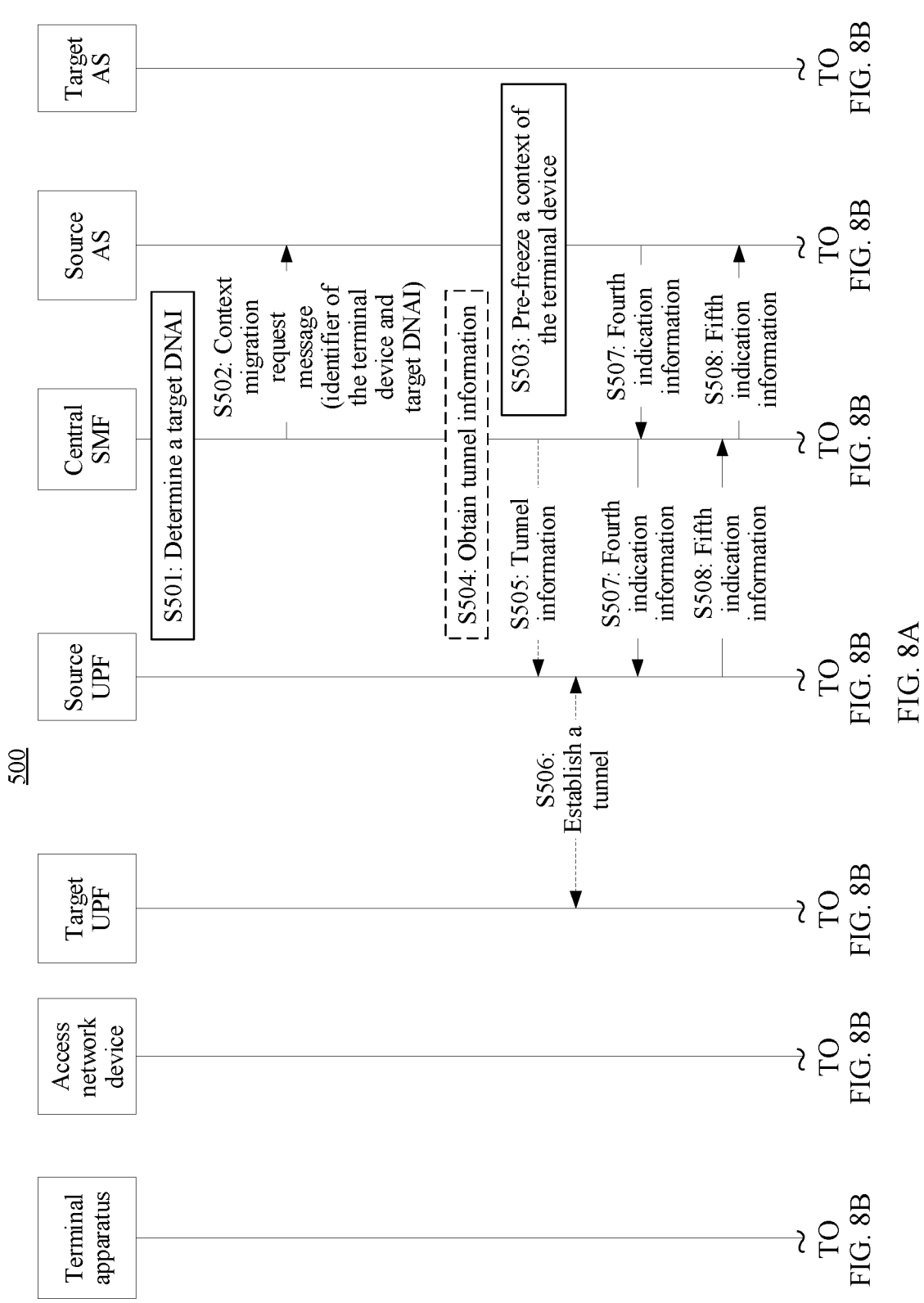
FIG. 8A and FIG. 8B are a schematic diagram of still another service packet transmission method according to an embodiment of this application.
Figure 8B:
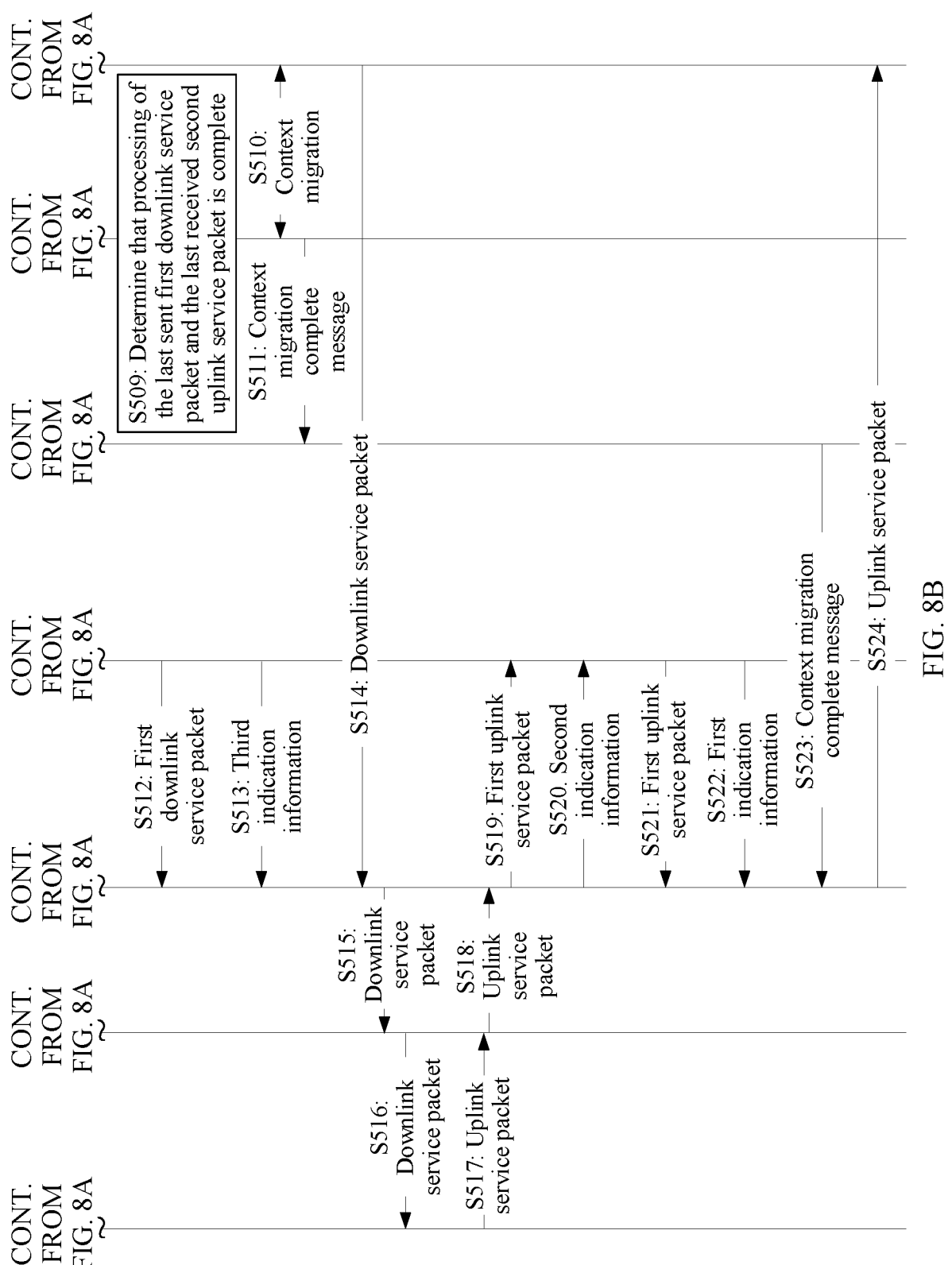

With reference to FIG. 8A and FIG. 8B, the following describes a service packet transmission method 500 in the scenario in FIG. 3 according to an embodiment of this application. The method 500 includes the following steps.

S501: A central SMF determines that a DNAI corresponding to an AS needs to change after a PSA of a terminal apparatus is handed over, and determines that context relocation or application relocation (application relocation) of the terminal apparatus needs to be performed, and the central SMF determines a target DNAI.

S502: The central SMF sends a context relocation request message to a source AS, and the source AS receives the context relocation request message sent by the central SMF, where the context relocation request message is used to trigger to relocate a context of the terminal apparatus, and the context relocation request message includes the target DNAI and an identifier of the terminal apparatus.

For example, the identifier of the terminal apparatus may be an identity (ID) of the terminal apparatus, an internet protocol (IP) address of the terminal apparatus, or a generic public subscription identifier (GPSI) of the terminal apparatus.

It should be noted that, in this embodiment of this application, the central SMF may directly interact with the source AS and a target AS; or may interact with the source AS by using a control plane network element AF of the source AS; or may interact with the target AS by using a control plane network element AF of the target AS. Control plane network elements of the source AS and the target AS may be a same AF or different AFs. The SMF may interact with the AF directly or by using an NEF. To avoid repetition, details are not described herein again.

It should be noted that in this embodiment of this application, an example in which the source AS and the target AS need to relocate a context of the terminal apparatus is merely used for description. However, this embodiment of this application is not limited thereto. The source AS and the target AS may alternatively relocate an application instance of the terminal apparatus. In view of this, the context relocation request message further includes an identifier of an application or an identifier of the application instance. In this way, the source AS and the target AS can relocate the application instance of the terminal.

Optionally, the first notification information in S401 of the method may be the context relocation request message in S502.

Optionally, the method 500 includes: S503: After the source AS receives the context relocation request message sent by the central SMF, the source AS pre-freezes the context of the terminal apparatus, to prepare to relocate the context of the terminal apparatus.

S504: After sending the context relocation request message to the source AS, the central SMF obtains tunnel information.

The tunnel information is used to establish an uplink packet forwarding tunnel between a source UPF and a target UPF. Optionally, in S504, the obtaining tunnel information includes: The central SMF may determine the tunnel information. Optionally, in S504, the obtaining tunnel information includes: The central SMF sends an N4 session modification request message to the target UPF, where the N4 session modification request is used to request the tunnel information from the target UPF. The target UPF sends a response message of the N4 session modification request message to the central SMF, where the response message of the N4 session modification request message includes the tunnel information.

It should be noted that an order of S503 and S504 is not limited, and S503 may be performed before, after, or simultaneously with S504.

S505: The central SMF sends the tunnel information to the source UPF.

S506: The source UPF and the target UPF establish the uplink tunnel based on the tunnel information.

S507: After S503, the source AS sends fourth indication information to the source UPF by using the central SMF, where the fourth indication information is used to indicate that a first downlink service packet is the last downlink service packet from the source AS, to be specific, after sending the first downlink service packet, the source AS no longer sends a downlink service packet to the source UPF. For example, the fourth indication information may be a sequence number of the first downlink service packet.

S508: After receiving the fourth indication information, the source UPF sends fifth indication information to the source AS by using the central SMF, where the fifth indication information is used to indicate that a second uplink service packet is the last uplink service packet sent by the source UPF to the source AS, to be specific, after sending the second uplink service packet to the source AS, the source UPF no longer sends an uplink service packet to the source AS. For example, the fifth indication information may be a sequence number of the second uplink service packet.

S509: The source AS determines, based on the fifth indication information, that the second uplink service packet is the last uplink service packet from the source UPF, and the source AS determines that processing of the last sent first downlink service packet and the last received second uplink service packet is complete.

S510: The source AS determines the target AS based on the target DNAI, and completes the relocation of the context of the terminal apparatus to the target AS.

S511: After the source AS and the target AS complete relocation of the context of the terminal apparatus, the source AS sends a context relocation complete message to the central SMF.

S512: The first downlink service packet is the last downlink service packet from the source AS, and the source UPF sends, to the target UPF, the last downlink service packet that is from the source AS.

S513: After receiving the fourth indication information and sending the first downlink service packet to the target UPF, the source UPF sends third indication information to the target UPF, where the third indication information is used to indicate to the target UPF that the sending of the downlink service packet from the source AS ends. In other words, the third indication information may indicate to the target UPF that sending of a downlink service packet on an old path or an original path ends.

Optionally, S512 and S513 may be performed simultaneously. To be specific, the source UPF may simultaneously send the third indication information and the first downlink service packet to the target UPF. For example, the third indication information is encapsulated into a packet header of the first downlink service packet for sending. In this case, S513 and S512 are performed after S507. Optionally, S512 is performed before S513. To be specific, the source UPF may send the third indication information after sending the first downlink service packet. In this case, S513 is performed after S507, and an order of S512 and S507 is also not limited. In other words, after receiving the fourth indication information, the source UPF is triggered to send the third indication information to the target UPF. If the first downlink service packet and the third indication information are simultaneously sent, the first downlink service packet and the third indication information are sent after S507. If the first downlink service packet is sent before the third indication information, the third indication information is sent after S507, and an order of S512 and S507 is not limited.

It should be noted that an order of S513 and S508 to S511 is not limited, and S513 only needs to be performed after S507.

S514: After S510, and after the target AS establishes a link to the target UPF, the target AS may send a downlink service packet to the target UPF.

S515: If the target UPF receives both the first downlink service packet from the source UPF in S512 and the downlink service packet from the target AS in S514, and if the target UPF has a downlink service packet from the target AS before receiving the third indication information, the target UPF buffers the downlink service packet that is from the target AS. After receiving the third indication information, and after determining that the first downlink service packet is sent to an access network device, the target UPF sends, to the access network device, the downlink service packet that is from the target AS. In this way, it can be ensured that the downlink service packet from the source AS is preferentially transmitted, and then the downlink service packet from the target AS is transmitted. This prevents downlink service packets from being out of order.

S516: The access network device sends the downlink service packet received in S515 to the terminal apparatus through an air interface.

S517: The terminal apparatus does not sense handover on a network side, and the terminal apparatus also sends an uplink service packet to the access network device when receiving the downlink service packet.

It should be noted that an order of S517 and any one of the foregoing steps is not limited. When the terminal apparatus needs to send the uplink service packet, S517 is performed, and no order limitation is imposed.

S518: The access network device sends, to the target UPF, the uplink service packet that is from the terminal apparatus.

Similarly, S518 only needs to be performed after S517, and an order of S518 and the foregoing other steps is not limited. When receiving the uplink service packet sent by the terminal apparatus, and the access network device needs to send the uplink service packet to the target UPF, S518 is performed, and no order limitation is imposed.

S519: After receiving the uplink service packet sent by the access network device, the target UPF sends a first uplink service packet to the source UPF, where the target UPF no longer sends an uplink service packet to the source UPF after receiving the third indication information.

S520: After receiving the third indication information, the target UPF sends second indication information to the source UPF, where the second indication information is used to indicate that the sending of the first uplink service packet by the target UPF ends, that is, the target UPF no longer sends the uplink service packet to the source UPF.

In an alternative manner of S520, after receiving the downlink service packet from the target AS or receiving the context relocation complete message sent by the central SMF, the target UPF sends the second indication information to the source UPF.

In other words, the target UPF may send the second indication information to the source UPF in two cases. Case 1: After receiving the third indication information sent by the source UPF, the target UPF sends the second indication information to the source UPF. Case 2: After receiving the downlink service packet from the target AS or receiving the context relocation complete message sent by the SMF, the target UPF sends the second indication information to the source UPF.

S521: After sending the fifth indication information to the source AS, and when receiving the first uplink service packet from the target UPF, the source UPF forwards the first uplink service packet to the target UPF.

S522: After receiving the second indication information from the target UPF, the source UPF sends first indication information to the target UPF. In this way, the target UPF may determine, by using the first indication information, that sending of the uplink service packet that is from the source UPF ends. For related descriptions of the first indication information and the second indication information, refer to the descriptions in the method 400.

S523: After S511, the central SMF may send the context relocation complete message to the target UPF.

S524: After S523, it indicates that the target UPF establishes the link to the target AS, and the target UPF may send an uplink service packet to the target AS. Alternatively, after the target UPF receives the downlink service packet that is from the target AS, the target UPF determines that the link is established to the target AS, and the target UPF may send an uplink service packet to the target AS. Specifically, a sending process is that the first uplink service packet, namely, the uplink service packet from the source UPF, is first sent, and then the uplink access packet directly from the access network device is sent. In an alternative manner of S523 and S524, the central SMF may send a forwarding rule to the target UPF, where the forwarding rule is used to indicate the target UPF to switch a path of the uplink service packet, and the target UPF may determine, according to the forwarding rule, that the link has been established between the target UPF and the target AS. The target UPF may send the uplink service packet to the target AS. The forwarding rule includes a parameter for sending the service packet, and the like. Specifically, a sending process is that: If there is the first uplink service packet, the first uplink service packet, namely, the uplink service packet from the source UPF, is first sent, and then the uplink access packet directly from the access network device is sent.

In other words, in S520, after the target UPF sends the first indication information to the source UPF, and before the target UPF determines that the target UPF can send the uplink service packet to the target AS in S524, the target UPF buffers the uplink service packet directly sent from the access network device.

It should be noted that the first uplink service packet is an uplink service packet that has been sent to the source UPF but has not been forwarded to the source AS in a context relocation process of the terminal apparatus. A packet that has been sent to the source UPF may also be referred to as a packet on an old path or an original path. In this case, the packet on the old path or the original path needs to be forwarded to the target UPF, and forwarded to the target AS by using the target UPF, to avoid loss of the uplink service packet. In addition, the first indication information is used to indicate that sending of the packet on the old path or the original path ends. In this way, the target UPF ensures that the uplink service packet from the access network device is sent after the uplink service packet on the old path or the original path is sent. This can avoid out-of-order of uplink service packets.

Figure 9A:
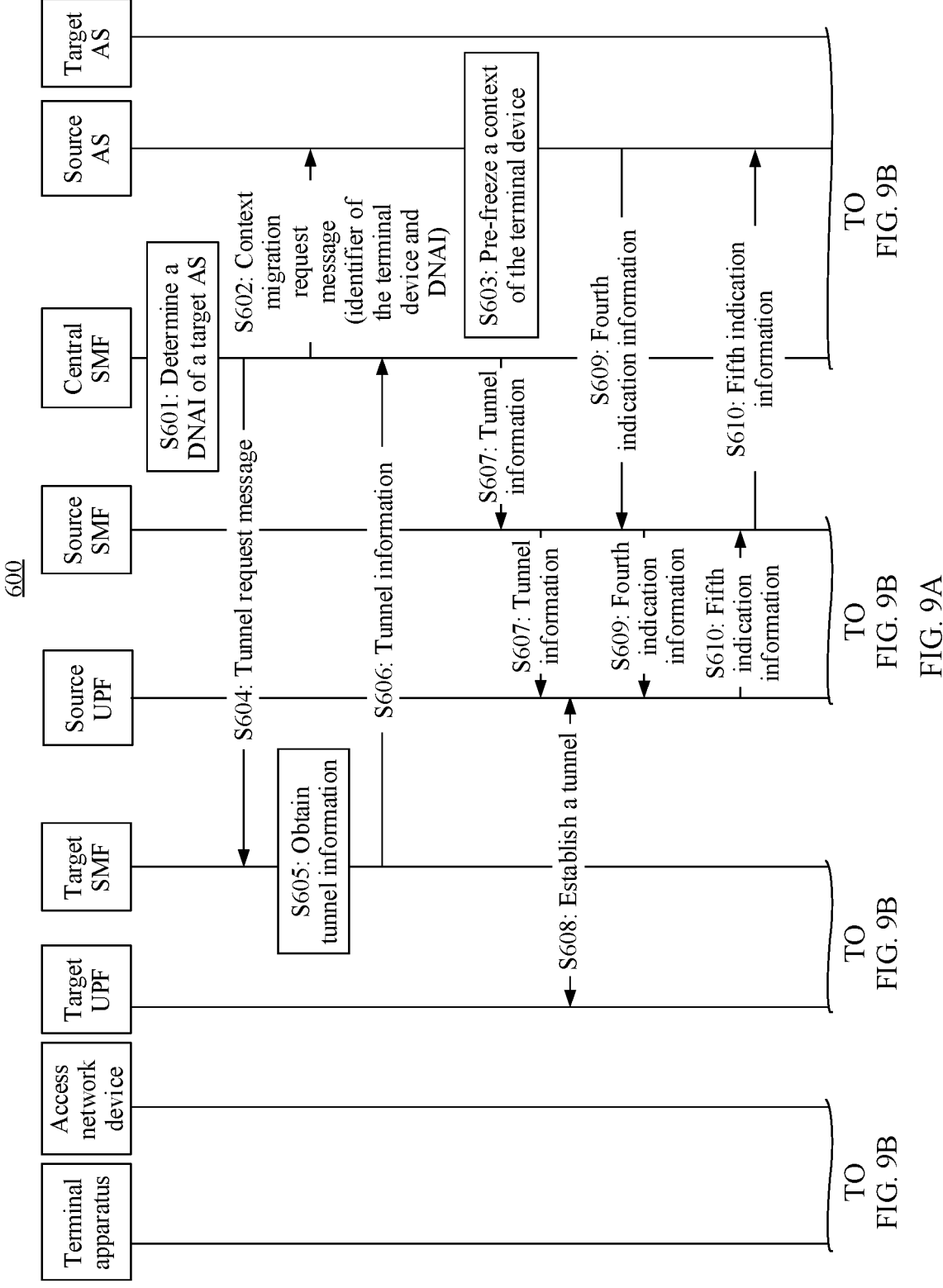
FIG. 9A, FIG. 9B, and FIG. 9C are a schematic diagram of still another service packet transmission method according to an embodiment of this application.
Figure 9B:
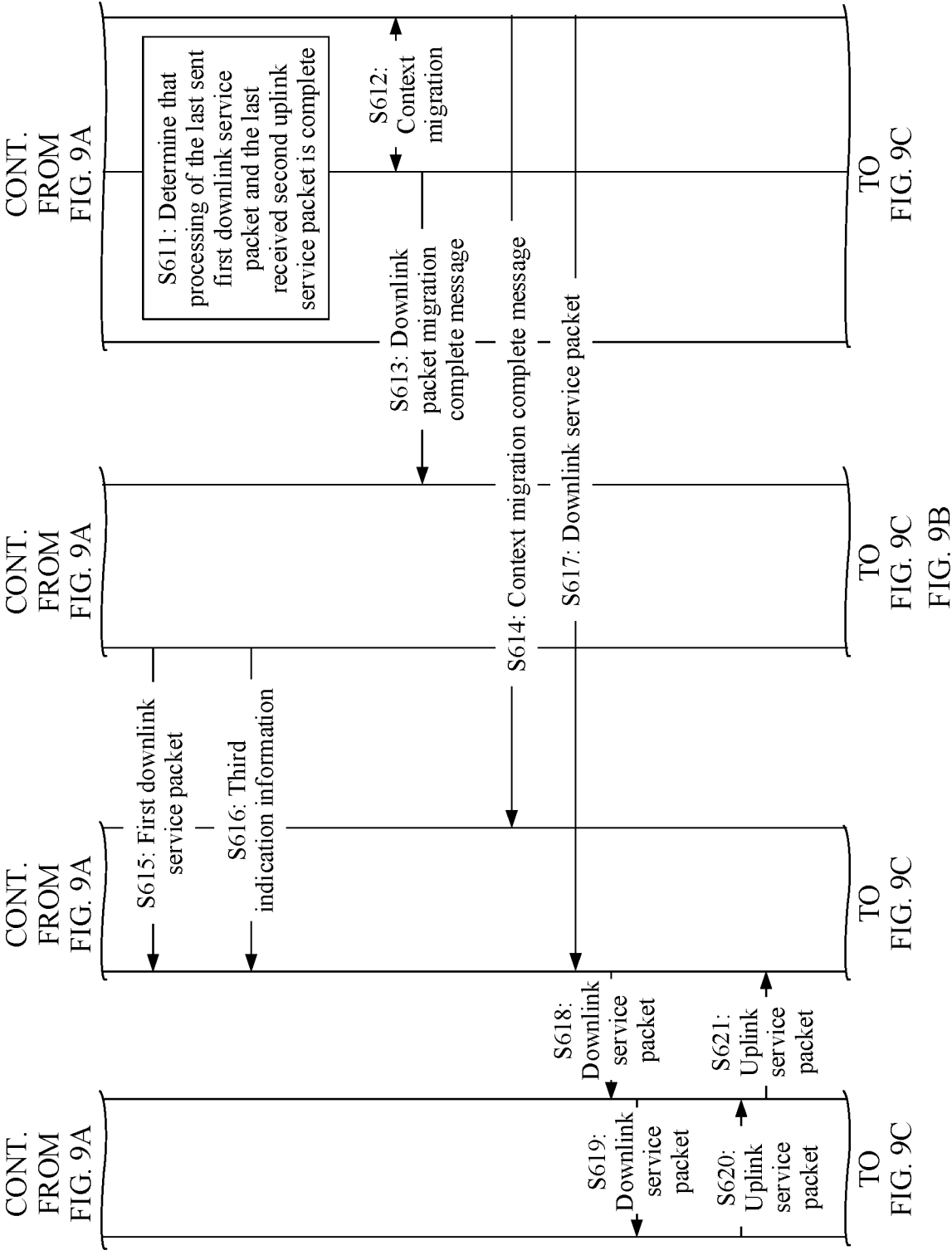
Figures 9B, 9C:
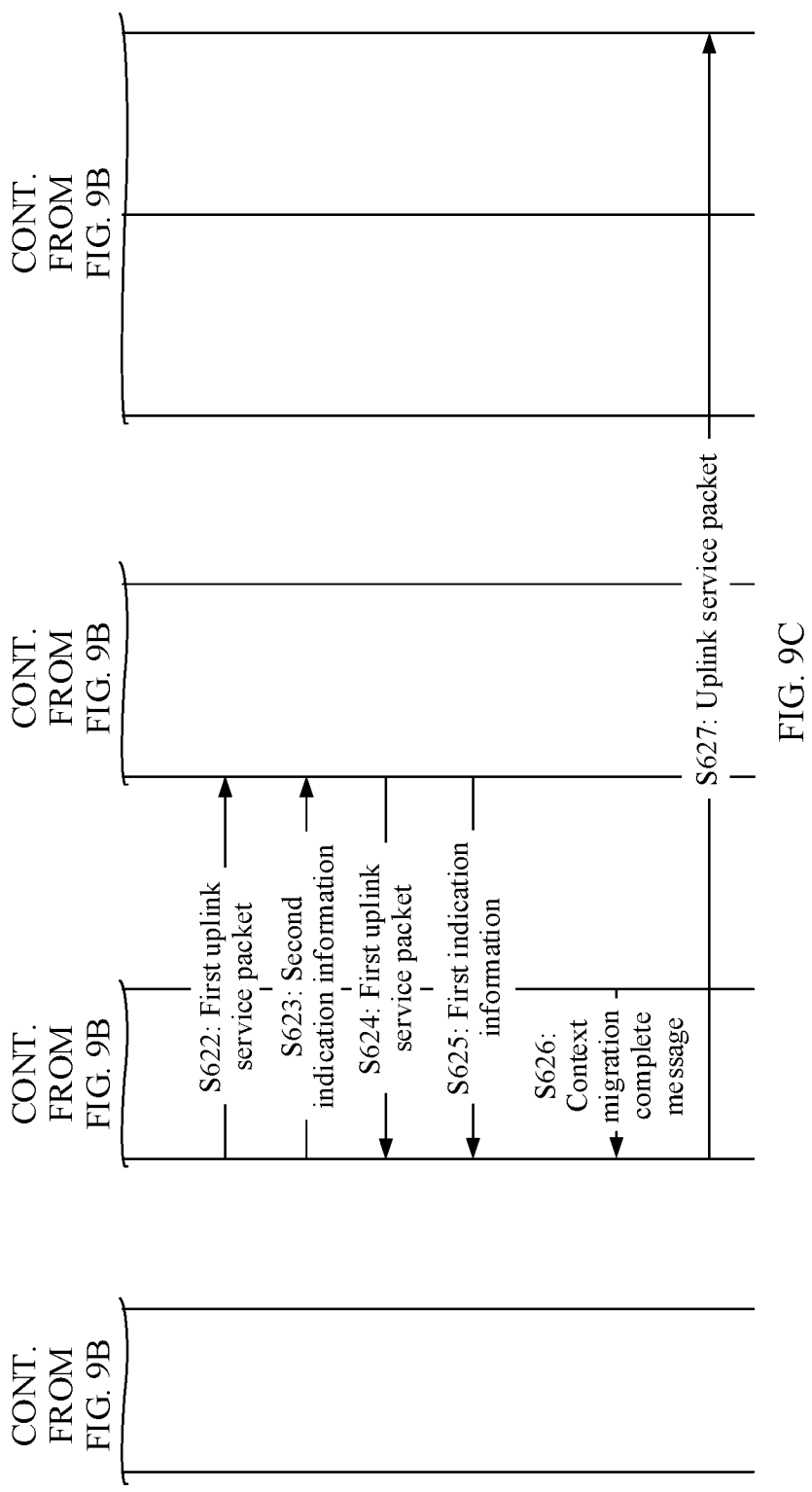

With reference to FIG. 9A, FIG. 9B, and FIG. 9C, the following describes a service packet transmission method 600 in the scenario in FIG. 4 according to an embodiment of this application. A difference between the method 600 and the method 500 lies in different scenarios. In the method 600, only steps different from those in the method 500 are described. For other steps, refer to the method 500. The method 600 includes the following steps.

S601 to S603 are the same as S501 to S503.

Optionally, the method 600 further includes: The central SMF sends a context relocation notification message to a source SMF, where the context relocation notification message includes the identifier of the terminal apparatus and/or the identifier of the application or the identifier of the application instance. Optionally, the context relocation notification message may further include an identifier of a PDU session. Optionally, the identifier of the terminal apparatus may be an SUPI. The context relocation notification message is used to indicate that a context of the application of the terminal apparatus needs to be relocated.

S604: After sending the context relocation request message to the source AS, the central SMF sends a tunnel request message to a target SMF, to request tunnel information from the target SMF, where the tunnel information is used to establish an uplink packet forwarding tunnel between a source UPF and a target UPF.

It should be noted that an order of S603 and S604 is not limited, and S603 may be performed before, after, or simultaneously with S604.

S605: The target SMF obtains the tunnel information, where the tunnel information may be allocated by the target SMF, and the target SMF may obtain the tunnel information. Alternatively, the tunnel information may be allocated by the target UPF. If the tunnel information is allocated by the target UPF, the target SMF sends an N4 session modification request message to the target UPF, to request the tunnel information from the target UPF, and the target UPF sends a response message of the N4 session modification request message to the target SMF, where the response message of the N4 session modification request message includes the tunnel information.

S606: The target SMF sends the obtained tunnel information to the central SMF.

Optionally, the target SMF may send the tunnel information to the central SMF by using a response message of the tunnel request message.

S607: The central SMF sends the tunnel information to the source UPF by using the source SMF.

S608: The source UPF and the target UPF establish the uplink tunnel based on the tunnel information.

S609: After S603, the source AS sends fourth indication information to the source UPF by using the source SMF, where the fourth indication information is used to indicate that a first downlink service packet is the last downlink service packet from the source AS, to be specific, after sending the first downlink service packet, the source AS no longer sends a downlink service packet to the source UPF. For example, the fourth indication information may be a sequence number of the first downlink service packet.

S610: After receiving the fourth indication information, the source UPF sends fifth indication information to the source AS by using the source SMF, where the fifth indication information is used to indicate that a second uplink service packet is the last uplink service packet sent by the source UPF to the source AS, to be specific, after sending the second uplink service packet to the source AS, the source UPF no longer sends an uplink service packet to the source AS. For example, the fifth indication information may be a sequence number of the second uplink service packet.

S611: The source AS determines, based on the fifth indication information, that the second uplink service packet is the last uplink service packet from the source UPF, and the source AS determines that processing of the last sent first downlink service packet and the last received second uplink service packet is complete.

S612: The source AS determines the target AS based on the target DNAI, and completes the relocation of the context of the terminal apparatus to the target AS.

S613: After the source AS and the target AS complete the relocation of the context of the terminal apparatus, the source AS sends a context relocation complete message to the source SMF.

S614: After the source AS and the target AS complete the relocation of the context of the terminal apparatus, the target AS sends a context relocation complete message to the target SMF.

Optionally, S613 and S614 may be simultaneously performed, or S613 may be performed before or after S614.

S615 and S616 are the same as S512 and S513.

It should be noted that an order of S616 and S610 to S614 is not limited, and S616 only needs to be performed after S609.

S617: After S612, and after the target AS establishes a link to the target UPF, the target AS may send a downlink service packet to the target UPF.

S618: If the target UPF receives both the first downlink service packet from the source UPF in S615 and the downlink service packet from the target AS in S617, and if the target UPF has a downlink service packet from the target AS before receiving the third indication information, the target UPF buffers the downlink service packet that is from the target AS. After receiving the third indication information, and after determining that the first downlink service packet is sent to an access network device, the target UPF sends, to the access network device, the downlink service packet that is from the target AS. In this way, it can be ensured that the service packet from the source AS is preferentially transmitted, and then the downlink service packet from the target AS is transmitted. This prevents downlink service packets from being out of order.

S619 to S625 are the same as S516 to S522.

It should be noted that an order of S620 and any one of the foregoing steps is not limited. When the terminal apparatus needs to send an uplink service packet, S620 is performed, and no order limitation is imposed.

In an alternative manner of S623, after receiving the downlink service packet from the target AS or receiving the context relocation complete message sent by the target SMF, the target UPF sends the second indication information to the source UPF.

In other words, the target UPF may send the second indication information to the source UPF in two cases. Case 1: After receiving the third indication information sent by the source UPF, the target UPF sends the second indication information to the source UPF. Case 2: After receiving the downlink service packet from the target AS or receiving the context relocation complete message sent by the target SMF, the target UPF sends the second indication information to the source UPF.

S626: After S614, the target SMF may send the context relocation complete message to the target UPF.

S627: After S626, it indicates that the target UPF establishes the link to the target AS, and the target UPF may send an uplink service packet to the target AS. Specifically, a sending process is that the first uplink service packet, namely, the uplink service packet from the source UPF, is first sent, and then the uplink access packet directly from the access network device is sent.

In an alternative manner of S626 and S627, the target SMF may send a forwarding rule to the target UPF, where the forwarding rule is used to indicate the target UPF to switch a path of the uplink service packet, and the target UPF may determine, according to the forwarding rule, that the link has been established between the target UPF and the target AS. The target UPF may send the uplink service packet to the target AS. Specifically, a sending process is that: If there is the first uplink service packet, the first uplink service packet, namely, the uplink service packet from the source UPF, is first sent, and then the uplink access packet directly from the access network device is sent.

It should be noted that the first uplink service packet is an uplink service packet that has been sent to the source UPF but has not been forwarded to the source AS in a context relocation process of the terminal apparatus. A packet that has been sent to the source UPF may also be referred to as a packet on an old path or an original path. In this case, the packet on the old path or the original path needs to be forwarded to the target UPF, and forwarded to the target AS by using the target UPF, to avoid loss of the uplink service packet. In addition, the first indication information is used to indicate that sending of the packet on the old path or the original path ends. In this way, the target UPF ensures that the uplink service packet from the access network device is sent after the uplink service packet on the old path or the original path is sent. This can avoid out-of-order of uplink service packets.

Figures 10, 11:
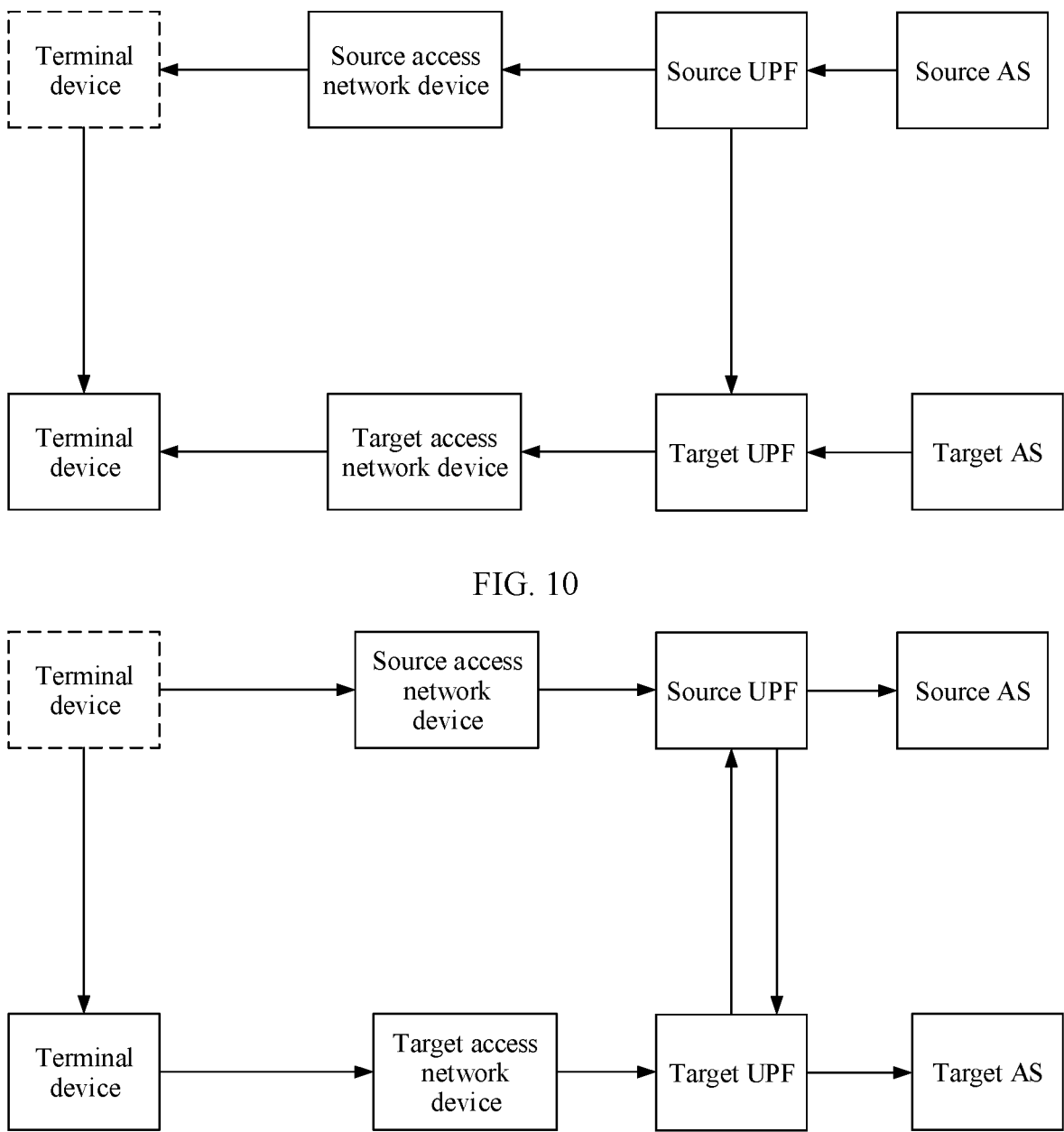
FIG. 10 is a schematic diagram of a downlink service packet transmission process according to an embodiment of this application.
FIG. 11 is a schematic diagram of an uplink service packet transmission process according to an embodiment of this application.

For a downlink service packet, as shown in FIG. 10, before a terminal apparatus moves, a transmission path of the downlink service packet is as follows: source AS-source UPF-source access network device-terminal apparatus. When the terminal apparatus moves from coverage of the source access network device to coverage of a target access network device, the terminal apparatus is handed over to the target access network device through air interface handover. In this case, a transmission path of the downlink service packet is as follows: source AS-source UPF-target UPF-target access network device-terminal apparatus, where the path is referred to as an old path or an original path. A transmission path of the service packet on the old path or the original path becomes longer, causing a higher latency of the packet on the old path or the original path. Therefore, the path of the downlink service packet needs to be switched to a new path, namely, target AS-target UPF-target access network device-terminal apparatus. However, when the path of the downlink service packet is switched from the old path or the original path to the new path, downlink service packets on the old path are prone to be out of order. In this embodiment of this application, the target UPF may simultaneously receive downlink service packets from the old path and the new path. In other words, the target UPF may receive a downlink service packet sent by the source UPF and also receive a downlink service packet sent by the target AS. For the downlink service packet on the old path, the source AS sends fourth indication information to the source UPF, to indicate that the last downlink service packet sent by the source AS to the source UPF is a first downlink service packet. After the source UPF receives the fourth indication information, and after the source UPF sends the first downlink service packet, the source UPF sends third indication information to the target UPF, to indicate that sending of the downlink service packet that is from the source AS ends. Before receiving the third indication information, the target UPF sequentially sends, to the target access network device, downlink service packets that are from the old path, and buffers a packet that is from the new path until the target UPF receives the third indication information. In addition, it is ensured that the downlink service packet on the new path is sent after all the downlink service packets on the old path are sent. In this way, out-of-order of downlink service packets can be avoided. In other words, it needs to be ensured that the target UPF sends the downlink service packet on the new path only after sending all the downlink service packets on the old path.

For an uplink service packet, as shown in FIG. 11, before a terminal apparatus moves, a transmission path of the uplink service packet is as follows: terminal apparatus-source access network device-source UPF-source AS. When the terminal apparatus moves from coverage of the source access network device to coverage of a target access network device, the terminal apparatus is handed over to the target access network device through air interface handover. In this case, a transmission path of the uplink service packet is as follows: terminal apparatus-target access network device-target UPF-source UPF-source AS, where the path is referred to as an old path or an original path. A transmission path of the service packet on the old path or the original path becomes longer, causing a higher latency of the packet on the old path or the original path. Therefore, the path of the uplink service packet needs to be switched to a new path: terminal apparatus-target access network device-target UPF-target AS. However, when the path of the uplink service packet is switched from the old path or the original path to the new path, the uplink service packet on the old path is prone to be lost. In the embodiments of this application, the target UPF may buffer an uplink service packet sent by the target access network device. In a path switching process, a part of uplink service packets from the target access network device are sent to the source UPF (the old path). The target UPF may first buffer the uplink service packet from the target access network device in the path switching process. For the uplink service packet on the old path, when the target UPF receives third indication information sent by the source UPF, it indicates that sending of a downlink service packet on the old path ends. When sending the last uplink service packet to the source UPF, the target UPF may simultaneously send second indication information to the source UPF, to indicate that sending of the uplink service packet that is from the target UPF ends. The target UPF starts to buffer the uplink service packet that is from the target access network device. After sending the last uplink service packet (a second uplink service packet) to the source AS, the source UPF sends all uplink service packets that are from the target UPF and first indication information to the target UPF, that is, forwards the packet on the old path to the new path in the switching process. The target UPF may determine, based on the first indication information, that sending of the uplink service packet on the old path ends. After ensuring that all service packets on the old path have been sequentially sent to the target AS, the target UPF sends the buffered uplink service packet that is from the target access network device. In this way, out-of-order of uplink service packets can be avoided while loss of the uplink service packet is avoided. In other words, it needs to be ensured that the target UPF sends the uplink service packet on the new path only after sending all the uplink service packets on the old path.

It should be noted that in this embodiment of this application, an example in which the source AS and the target AS need to relocate the context of the terminal apparatus is used for description. For example, the first notification information in S401 of the method 400 includes the identifier of the terminal apparatus. The context relocation request message in S502 of the method 500 and S602 of the method 600 includes the identifier of the terminal apparatus. However, the embodiments of this application are not limited thereto. The terminal apparatus may be running an application (APP). In this case, the source AS and the target AS need to relocate a context of the application of the terminal apparatus. For example, the first notification information in S401 of the method 400 includes the identifier of the terminal apparatus and an identifier of the application, and the context relocation request message in S502 of the method 500 and S602 of the method 600 includes the identifier of the terminal apparatus and the identifier of the application. The terminal apparatus may be running a PDU session. In this case, the source AS and the target AS need to relocate a context of the PDU session of the terminal apparatus. For example, the first notification information in S401 of the method 400 includes the identifier of the terminal apparatus and an identifier of the PDU session, and the context relocation request message in S502 of the method 500 and S602 of the method 600 includes the identifier of the terminal apparatus and the identifier of the session. To avoid repeated description, details are not described in the embodiments of this application by using examples.

It should also be noted that the tunnel established by using the tunnel information in the foregoing method may be a terminal-level tunnel, a PDU session-level tunnel, or a UPF device-level tunnel. To be specific, the terminal-level tunnel indicates that a same terminal apparatus shares one tunnel, the PDU session-level tunnel indicates that a same PDU session of same UE shares one tunnel, and the UPF device-level tunnel indicates that a device-level tunnel is established between the source UPF and the target UPF and all terminals and sessions share the tunnel. In some possible implementations, the source UPF and the target UPF may establish a UPF device-level tunnel in advance, that is, the foregoing processes of obtaining the tunnel information and sending the tunnel information do not need to be performed. In some other possible implementations, when the terminal apparatus moves to the target access network device, the central SMF may pre-establish a terminal-level or PDU session-level tunnel between the source UPF and the target UPF, that is, the foregoing processes of obtaining the tunnel information and sending the tunnel information do not need to be performed.

It should further be noted that, in the embodiments of this application, the first downlink service packet may be first sent and then the third indication information may be sent, or the first downlink service packet and the third indication information may be simultaneously sent. When the first downlink service packet and the third indication information are simultaneously sent, a specific bit in the packet header of the first downlink service packet may be set to a specific value. For example, the specific value is 1 or 0, to be specific, when the specific value is 0 or 1, it indicates that the first downlink service packet is the last downlink service packet from the source AS.

In the embodiments of this application, the first uplink service packet may be first sent and then the first indication information (or the second indication information) may be sent, or the first uplink service packet and the first indication information (or the second indication information) may be simultaneously sent. When the first uplink service packet and the first indication information (or the second indication information) are simultaneously sent, a specific bit in the last service packet header in the first downlink service packet may be set to a specific value as the first indication information or the second indication information. For example, the specific value is 1 or 0, to be specific, when the specific value is 0 or 1, it indicates that sending of the first uplink service packet ends.

The foregoing describes in detail the service packet transmission method according to the embodiments of this application with reference to FIG. 1 to FIG. 11. The following describes in detail service packet transmission apparatuses according to the embodiments of this application with reference to FIG. 12 to FIG. 15.

Figure 12:
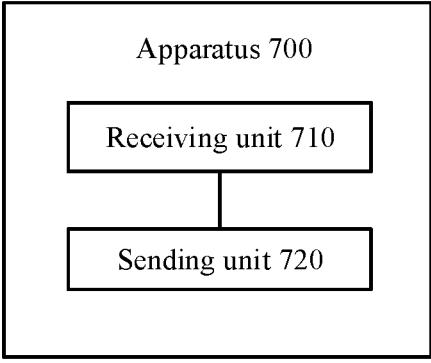
FIG. 12 is a schematic block diagram of a service packet transmission apparatus according to an embodiment of this application.

FIG. 12 is a schematic block diagram of a service packet transmission apparatus 700 according to an embodiment of this application. The apparatus 700 may correspond to the target UPF network element described in the foregoing method, or may correspond to a chip or a component of the target UPF network element. Each module or unit in the apparatus 700 may be configured to perform each action or processing process performed by the target UPF network element in the foregoing method. As shown in FIG. 12, the service packet transmission apparatus 700 may include a receiving unit 710 and a sending unit 720.

The receiving unit 710 is configured to receive a first uplink service packet from a source user plane function network element, where the first uplink service packet is an uplink service packet received after the source UPF receives a second uplink service packet, and the second uplink service packet is the last uplink service packet sent by the source user plane network element to a source application server (AS).

The receiving unit 710 is further configured to receive first indication information from the source UPF, where the first indication information is used to indicate that sending of the first uplink service packet by the source user plane network element ends.

The sending unit 720 is configured to: after the first indication information is received, send, to a target AS after the first uplink service packet is sent, an uplink service packet that is sent by an access network device to the target UPF.

In an optional embodiment, the sending unit 720 is further configured to: before the first uplink service packet from the source user plane network element is received, send the first uplink service packet and second indication information to the source user plane network element, where the second indication information is used to indicate that the sending of the first uplink service packet by the target UPF ends.

In an optional embodiment, the receiving unit 710 is further configured to: before receiving the first uplink service packet from the source UPF, receive a first downlink service packet and third indication information from the source UPF network element, where the third indication information is used to indicate that sending of a downlink service packet that is from the source AS ends.

In an optional embodiment, the sending unit 720 is further configured to: after the third indication information from the source user plane network element is received and the first downlink service packet is sent, send, to the access network device, a downlink service packet that is from the target AS.

In an optional embodiment, the sending unit 720 is specifically configured to send the second indication information to the source user plane network element based on the third indication information.

In an optional embodiment, the sending unit 720 is specifically configured to: after the downlink service packet from the target AS is received or a context relocation complete message from a session management function SMF network element is received, send the second indication information to the source user plane network element.

It should be understood that for a specific process in which each unit in the apparatus 700 performs the foregoing corresponding step, refer to the descriptions of the foregoing method embodiments with reference to FIG. 5 to FIG. 11. For brevity, details are not described herein again.

Figure 13:
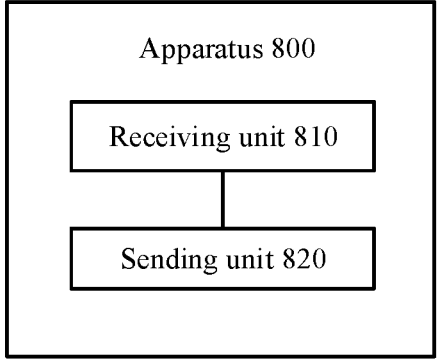
FIG. 13 is a schematic block diagram of another service packet transmission apparatus according to an embodiment of this application.

FIG. 13 is a schematic block diagram of a service packet transmission apparatus 800 according to an embodiment of this application. The apparatus 800 may correspond to the source UPF network element described in the foregoing method, or may correspond to a chip or a component of the source UPF network element. Each module or unit in the apparatus 800 may be configured to perform each action or processing process performed by the source UPF network element in the foregoing method. As shown in FIG. 13, the service packet transmission apparatus 800 may include a receiving unit 810 and a sending unit 820.

The receiving unit 810 is configured to: after receiving a second uplink service packet, receive a first uplink service packet, where the second uplink service packet is the last uplink service packet sent by the apparatus 800 to a source application server.

The sending unit 820 is configured to send the first uplink service packet to a target UPF network element.

The sending unit 820 is further configured to send first indication information to the target UPF, where the first indication information is used to indicate that the sending of the first uplink service packet by the apparatus 800 ends.

In an optional embodiment, the receiving unit 810 is further configured to: before the first uplink service packet is sent to the target UPF network element, receive second indication information from the target UPF network element, where the second indication information is used to indicate that sending of the first uplink service packet by the target UPF ends.

In an optional embodiment, the sending unit 820 is further configured to: before sending the first uplink service packet to the target UPF network element, send a first downlink service packet and third indication information to the target UPF network element, where the third indication information is used to indicate that sending of a downlink service packet that is from the source AS ends.

In an optional embodiment, the receiving unit 810 is specifically configured to receive the second indication information sent by the target user plane network element based on the third indication information.

In an optional embodiment, the receiving unit 810 is specifically configured to: before the first downlink service packet and the third indication information are sent to the target user plane network element, receive fourth indication information sent by a first network element, where the fourth indication information is used to indicate that the first downlink service packet is the last downlink service packet from the source AS.

The sending unit 820 is further configured to send fifth indication information to the first network element, where the fifth indication information is used to indicate that the second uplink service packet is the last uplink service packet sent by the apparatus to the source AS.

It should be understood that for a specific process in which each unit in the apparatus 800 performs the foregoing corresponding step, refer to the descriptions of the foregoing method embodiments with reference to FIG. 5 to FIG. 11. For brevity, details are not described herein again.

Figure 14:
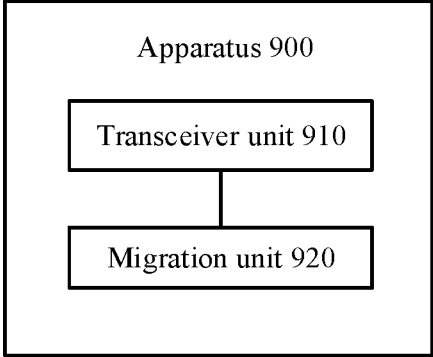
FIG. 14 is a schematic block diagram of still another service packet transmission apparatus according to an embodiment of this application.

FIG. 14 is a schematic block diagram of a service packet transmission apparatus 900 according to an embodiment of this application. The apparatus 900 may correspond to the source AS described in the foregoing method, or may correspond to a chip or a component of the source AS. Each module or unit in the apparatus 900 may be configured to perform each action or processing process performed by the source AS in the foregoing method. As shown in FIG. 14, the service packet transmission apparatus 900 may include a transceiver unit 910 and a relocation unit 920.

The transceiver unit 910 is configured to receive first notification information sent by a session management function SMF network element, where the first notification information is used to notify that a data network access point identifier (DNAI) changes or is used to notify that a UPF network element changes, and the first notification information includes a target data network access point identifier (DNAI) and an identifier of a terminal apparatus.

The relocation unit 920 is configured to: after it is determined that processing of a first downlink service packet and a second uplink service packet is complete, relocate a context of the terminal apparatus to a target AS corresponding to the target DNAI, where the first downlink service packet is the last downlink service packet sent by the apparatus to a source user plane function UPF network element, and the second uplink service packet is the last uplink service packet sent by the source UPF network element to the apparatus.

In an optional embodiment, the transceiver unit 910 is further configured to: before the context of the terminal apparatus is relocated to the target AS corresponding to the target DNAI, send fourth indication information to the source UPF network element, where the fourth indication information is used to indicate that the first downlink service packet is the last downlink service packet from the apparatus; and receive fifth indication information sent by the source UPF network element, where the fifth indication information is used to indicate that the second uplink service packet is the last uplink service packet sent by the source UPF network element to the apparatus.

It should be understood that for a specific process in which each unit in the apparatus 900 performs the foregoing corresponding step, refer to the descriptions of the foregoing method embodiments with reference to FIG. 5 to FIG. 11. For brevity, details are not described herein again.

The apparatus 700 in the foregoing solutions has a function of implementing corresponding steps performed by the target UPF network element in the foregoing methods. The apparatus 800 in the foregoing solutions has a function of implementing corresponding steps performed by the source UPF network element in the foregoing methods. The apparatus 900 in the foregoing solutions has a function of implementing corresponding steps performed by the source AS in the foregoing methods. The function may be implemented by hardware or software, or may be implemented by hardware executing corresponding software. The hardware or the software includes one or more modules corresponding to the foregoing functions. For example, the sending unit may be replaced with a communication interface, the receiving unit may be replaced with a communication interface, and another unit, for example, the determining unit, may be replaced with a processor, to separately perform a sending operation, a receiving operation, and a related processing operation in the method embodiments. In this embodiment of this application, a communication interface of an apparatus is used by the apparatus to communicate with another device. For example, the communication interface may be a transmitter, a receiver, a transceiver, a circuit, a bus, a module, a pin, or another type of communication interface. This is not limited in this embodiment of this application.

In a specific implementation process, the processor may be configured to perform, for example, but not limited to, baseband related processing, and the communication interface may be configured to perform, for example, but not limited to, information exchange. The foregoing components may be separately disposed on chips independent of each other, or at least some or all of the components may be disposed on a same chip. For example, the processor may further be classified into an analog baseband processor and a digital baseband processor. The analog baseband processor and the communication interface may be integrated on a same chip, and the digital baseband processor may be disposed on an independent chip. With continuous development of integrated circuit technologies, more components can be integrated into a same chip. For example, the digital baseband processor and a plurality of application processors (for example, but not limited to a graphics processor and a multimedia processor) may be integrated into a same chip. Such chip may be referred to as a system on chip (SOC). Whether all the components are separately disposed on different chips or integrated and disposed on one or more chips usually depends on a specific requirement for a product design. A specific implementation of the components is not limited in the embodiments of this application.

Figure 15:
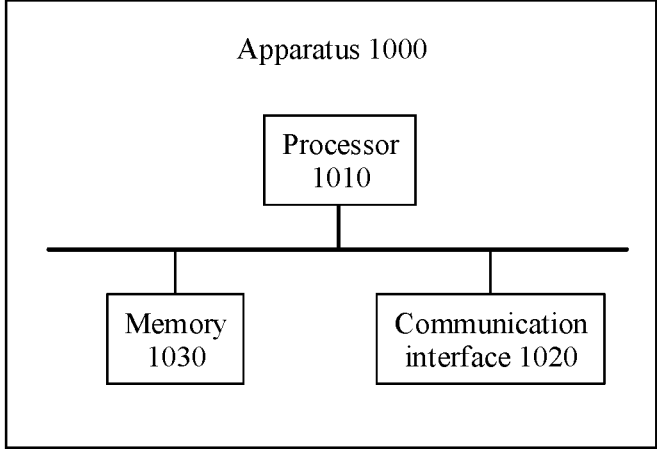
FIG. 15 is a schematic block diagram of still another service packet transmission apparatus according to an embodiment of this application.

It may be understood that the processor in the foregoing embodiments may execute program instructions by using a hardware platform having a processor and a communication interface, to separately implement a function of the processor in any design in the foregoing embodiments of this application. Based on this, as shown in FIG. 15, an embodiment of this application provides a schematic block diagram of a packet transmission apparatus 1000. The apparatus 1000 includes a processor 1010, a communication interface 1020, and a memory 1030. The processor 1010, the communication interface 1020, and the memory 1030 are coupled to communicate with each other. The memory 1030 is configured to store instructions. The processor 1010 is configured to execute the instructions stored in the memory 1030, to control the communication interface 1020 to send a signal and/or receive a signal. Coupling in this embodiment of this application is an indirect coupling or a communication connection between apparatuses, units, or modules, may be in an electrical form, a mechanical form, or another form, and is used for information exchange between the apparatuses, the units, or the modules.

In a possible implementation, if the apparatus 1000 is a target UPF network element, the communication interface 1020 is configured to receive a first uplink service packet from a source user plane function UPF network element, where the first uplink service packet is an uplink service packet received after the source UPF receives a second uplink service packet, and the second uplink service packet is the last uplink service packet sent by the source UPF network element to a source application server (AS). The communication interface 1020 is further configured to receive first indication information from the source UPF, where the first indication information is used to indicate that sending of the first uplink service packet by the source UPF ends. The communication interface 1020 is further configured to: after receiving the first indication information, send, to a target AS after the first uplink service packet is sent, an uplink service packet sent by an access network device to the target UPF.

In a possible implementation, if the apparatus 1000 is a source UPF network element, the communication interface 1020 is configured to: after receiving a second uplink service packet, receive a first uplink service packet, where the second uplink service packet is the last uplink service packet sent by the apparatus 1000 to a source application server. The communication interface 1020 is further configured to send a first uplink service packet to a target user plane function UPF network element. The communication interface 1020 is further configured to send first indication information to the target UPF, where the first indication information is used to indicate that the sending of the first uplink service packet by the apparatus 1000 ends.

In a possible implementation, if the apparatus 1000 is a source AS network element, the communication interface 1020 is configured to receive first notification information sent by a session management function SMF network element, where the first notification information is used to notify that a data network access point identifier (DNAI) changes or is used to notify that a UPF network element changes, and the first notification information includes a target data network access point identifier (DNAI) and an identifier of a terminal apparatus. The processor 1010 is configured to: after determining that processing of a first downlink service packet and a second uplink service packet is complete, relocate a context of the terminal apparatus to a target AS corresponding to the target DNAI, where the first downlink service packet is the last downlink service packet sent by the apparatus 1000 to a source user plane function UPF network element, and the second uplink service packet is the last uplink service packet sent by the source UPF to the apparatus 1000.

It should be understood that the apparatus in FIG. 12, the apparatus in FIG. 13, or the apparatus in FIG. 14 in the embodiments of this application may be implemented by using the apparatus 1000 in FIG. 15, and may be configured to perform steps and/or procedures corresponding to the target UPF, the source UPF, and the source AS in the foregoing method embodiments.

It may be understood that the methods, the procedures, the operations, or the steps in the designs described in the embodiments of this application can be implemented in a one-to-one correspondence manner by using computer software, electronic hardware, or a combination of computer software and electronic hardware. Whether the functions are performed by hardware or software depends on particular applications and a design constraint condition of the technical solutions. For example, in terms of good universality, low costs, and decoupling between software and hardware, a program instruction may be executed to implement the functions. For another example, in terms of system performance and reliability, a dedicated circuit may be used to implement the functions. A person of ordinary skill in the art may use different methods to implement the described functions for each particular application. This is not limited herein.

According to the methods provided in the embodiments of this application, this application further provides a computer program product. The computer program product includes computer program code. When the computer program code is run on a computer, the computer performs the methods in the foregoing embodiments. The embodiments in this application may also be combined with each other.

According to the methods provided in the embodiments of this application, this application further provides a computer-readable medium. The computer-readable medium stores program code. When the program code is run on a computer, the computer is enabled to perform the methods in the foregoing embodiments.

In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments can be completed by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed. The general-purpose processor may be a microprocessor, any conventional processor, or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more preferred or more advantageous than another embodiment or design. To be specific, these terms are used to present a related concept in a specific manner.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Understanding of technical meanings of technical terms in this application should be determined mainly based on functions and technical effects that are of the technical terms and that are reflected/performed in the technical solutions.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all or some of the procedures or the functions according to the embodiments of this application are generated. The computer may be a general-purpose computer, a special-purpose computer, a computer network, a network device, a terminal apparatus, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again. In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service packet transmission method, comprising:
sending, by a target user plane network element, a first uplink service packet to a source user plane network element on a path to a source application server, wherein the first uplink service packet is received by the source user plane network element from the target user plane network element after the source user plane network element receives a second uplink service packet, and the second uplink service packet is a last uplink service packet sent by the source user plane network element on the path to the source application server;

receiving, by the target user plane network element, the first uplink service packet from the source user plane network element;

receiving, by the target user plane network element, first indication information from the source user plane network element, wherein the first indication information is used to indicate that sending of the first uplink service packet by the source user plane network element on the path ends; and after the target user plane network element receives the first indication information, sending, by the target user plane network element to a target application server after the first uplink service packet is sent, an uplink service packet that is sent by an access network device to the target user plane network element.

2. The method according to claim 1, wherein before receiving, by the target user plane network element, the first uplink service packet from the source user plane network element, the method further comprises:

sending, by the target user plane network element, second indication information to the source user plane network element, wherein the second indication information is used to indicate that the sending of the first uplink service packet by the target user plane network element ends.

3. The method according to claim 2, wherein before receiving, by the target user plane network element, the first uplink service packet from the source user plane network element, the method further comprises:

receiving, by the target user plane network element, a first downlink service packet and third indication information from the source user plane network element, wherein the third indication information is used to indicate an end of downlink service packet sent from the source application server.

4. The method according to claim 3, wherein after receiving, by the target user plane network element, the third indication information from the source user plane network element, the method further comprises:

after the first downlink service packet is sent, sending, by the target user plane network element to the access network device, a downlink service packet that is from the target application server.

5. The method according to claim 3, wherein sending, by the target user plane network element, the second indication information to the source user plane network element comprises:

sending, by the target user plane network element, the second indication information to the source user plane network element based on the third indication information.

6. The method according to claim 1, further comprising:

after the source user plane network element receives the second uplink service packet, receiving, by the source user plane network element, the first uplink service packet sent by the target user plane network element;

sending, by the source user plane network element, the first uplink service packet to the target user plane network element; and sending, by the source user plane network element, the first indication information to the target user plane network element.

7. The method according to claim 6, wherein before sending, by the source user plane network element, the first uplink service packet to the target user plane network element, the method further comprises:

receiving, by the source user plane network element, second indication information from the target user plane network element, wherein the second indication information is used to indicate that the sending of the first uplink service packet by the target user plane network element ends.

8. The method according to claim 7, wherein before sending, by the source user plane network element, the first uplink service packet to the target user plane network element, the method further comprises:

sending, by the source user plane network element, a first downlink service packet and third indication information to the target user plane network element, wherein the third indication information is used to indicate an end of downlink service packet sent from the source application server.

9. The method according to claim 8, wherein receiving, by the source user plane network element, the second indication information from the target user plane network element comprises:

receiving, by the source user plane network element, the second indication information sent by the target user plane network element based on the third indication information.

10. The method according to claim 8, wherein before sending, by the source user plane network element, the first downlink service packet and the third indication information to the target user plane network element, the method further comprises:

receiving, by the source user plane network element, fourth indication information sent by a first network element, wherein the fourth indication information is used to indicate that the first downlink service packet is the last downlink service packet from the source application server; and sending, by the source user plane network element, fifth indication information to the first network element, wherein the fifth indication information is used to indicate that the second uplink service packet is the last uplink service packet sent by the source user plane network element to the source application server.

11. The method according to claim 1, further comprising:

receiving, by the source application server, first notification information sent by a session management function network element, wherein the first notification information is used to notify that a data network access point identifier changes or is used to notify that the target user plane network element changes, and the first notification information comprises a target data network access point identifier and an identifier of a terminal apparatus; and after the source application server processes a first downlink service packet and the second uplink service packet, relocating, by the source application server, a context of the terminal apparatus to the target application server corresponding to the target data network access point identifier, wherein the first downlink service packet is the last downlink service packet sent by the source application server to the source user plane network element, and the second uplink service packet is the last uplink service packet sent by the source user plane network element to the source application server.

12. The method according to claim 11, wherein before relocating, by the source application server, the context of the terminal apparatus to the target application server corresponding to the target data network access point identifier, the method further comprises:

sending, by the source application server, fourth indication information to the source user plane network element, wherein the fourth indication information is used to indicate that the first downlink service packet is the last downlink service packet from the source application server; and receiving, by the source application server, fifth indication information sent by the source user plane network element, wherein the fifth indication information is used to indicate that the second uplink service packet is the last uplink service packet sent by the source user plane network element to the source application server.

13. An apparatus, wherein the apparatus is a target user plane network element, and the apparatus comprises:

at least one processor, and a memory coupled to the at least one processor and storing programming instructions for execution by the at least one processor to:

send a first uplink service packet to a source user plane network element on a path to a source application server, wherein the first uplink service packet is received by the source user plane network element from the target user plane network element after the source user plane network element receives a second uplink service packet, and the second uplink service packet is a last uplink service packet sent by the source user plane network element on the path to the source application server;

receive the first uplink service packet from the source user plane network element;

receive first indication information from the source user plane network element, wherein the first indication information is used to indicate that sending of the first uplink service packet by the source user plane network element on the path ends; and after receiving the first indication information, send, to a target application server after the first uplink service packet is sent, an uplink service packet that is sent by an access network device to the target user plane network element.

14. The apparatus according to claim 13, wherein the programming instructions are for execution by the at least one processor to:

before receiving the first uplink service packet from the source user plane network element, send second indication information to the source user plane network element, wherein the second indication information is used to indicate that the sending of the first uplink service packet by the target user plane network element ends.

15. The apparatus according to claim 14, wherein the programming instructions are for execution by the at least one processor to:

before receiving the first uplink service packet from the source user plane network element, receive a first downlink service packet and third indication information from the source user plane network element, wherein the third indication information is used to indicate an end of downlink service packet sent from the source application server.

16. The apparatus according to claim 15, wherein the programming instructions are for execution by the at least one processor to:

after receiving the third indication information from the source user plane network element and the first downlink service packet is sent, send, to the access network device, a downlink service packet that is from the target application server.

17. An apparatus, wherein the apparatus is a source user plane network element, and the apparatus comprises:

at least one processor; and a memory coupled to the at least one processor and storing programming instructions for execution by the at least one processor to:

after receiving a second uplink service packet to be sent on a path to a source application server, receive a first uplink service packet sent by a target user plane network element on the path to the source application server, wherein the second uplink service packet is a last uplink service packet sent by the source user plane network element on the path to the source application server;

send the first uplink service packet to the target user plane network element; and send first indication information to the target user plane network element, wherein the first indication information is used to indicate that the sending of the first uplink service packet by the source user plane network element on the path ends.

18. The apparatus according to claim 17, wherein the programming instructions are for execution by the at least one processor to:

before sending the first uplink service packet to the target user plane network element, receive second indication information from the target user plane network element, wherein the second indication information is used to indicate that the sending of the first uplink service packet by the target user plane network element ends.

19. The apparatus according to claim 18, wherein the programming instructions are for execution by the at least one processor to:

before sending the first uplink service packet to the target user plane network element, send a first downlink service packet and third indication information to the target user plane network element, wherein the third indication information is used to indicate that sending of a downlink service packet that is from the source application server ends.

20. The apparatus according to claim 19, wherein the programming instructions are for execution by the at least one processor to:

before sending the first downlink service packet and the third indication information to the target user plane network element, receive fourth indication information sent by a first network element, wherein the fourth indication information is used to indicate that the first downlink service packet is the last downlink service packet from the source application server; and send fifth indication information to the first network element, wherein the fifth indication information is used to indicate that the second uplink service packet is the last uplink service packet sent by the source user plane network element to the source application server.

* * * * *